United States Patent
Abe

(10) Patent No.: US 10,396,851 B2
(45) Date of Patent: Aug. 27, 2019

(54) EQUALIZATION PROCESSING CIRCUIT, DIGITAL RECEIVER, SIGNAL TRANSMITTING/RECEIVING SYSTEM, EQUALIZATION PROCESSING METHOD, AND DIGITAL RECEIVING METHOD

(71) Applicant: NEC Corporation, Minato-ku, Tokyo (JP)

(72) Inventor: Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/101,995

(22) PCT Filed: Nov. 19, 2014

(86) PCT No.: PCT/JP2014/005801
§ 371 (c)(1),
(2) Date: Jun. 6, 2016

(87) PCT Pub. No.: WO2015/087494
PCT Pub. Date: Jun. 18, 2015

(65) Prior Publication Data
US 2016/0308579 A1    Oct. 20, 2016

(30) Foreign Application Priority Data

Dec. 9, 2013 (JP) ................................ 2013-254116

(51) Int. Cl.
*H04B 3/06* (2006.01)
*H04B 10/2507* (2013.01)
(Continued)

(52) U.S. Cl.
CPC ............. *H04B 3/06* (2013.01); *H04B 1/0475* (2013.01); *H04B 10/2507* (2013.01); *H04B 10/61* (2013.01); *H04B 2001/0491* (2013.01)

(58) Field of Classification Search
CPC ........ H04B 3/06; H04B 1/0475; H04B 10/61; H04B 10/2507; H04B 2001/0491
(Continued)

(56) References Cited

U.S. PATENT DOCUMENTS

2004/0223562 A1* 11/2004 Oliver ............... H04L 25/03006
375/348
2005/0259767 A1* 11/2005 Garmany ............... H04B 7/005
375/343
(Continued)

FOREIGN PATENT DOCUMENTS

JP     2009-038801 A     2/2009
JP     2010-268404 A     11/2010
(Continued)

OTHER PUBLICATIONS

Fabian. N. Hauske, Maxim Kuschnerov, Bernhard Spinnler, and Berthold Lankl, "Optical Performance Monitoring in Digital Coherent Receivers," Journal of Lightwave Technology, vol. 27, No. 16, Aug. 15, 2009. English Abstract Cited in the Specification.
(Continued)

*Primary Examiner* — Chieh M Fan
*Assistant Examiner* — Fitwi Y Hailegiorgis

(57) ABSTRACT

It is made possible to compensate for a waveform distortion having semi-fixed characteristics and a waveform distortion varying at high speed with a high degree of accuracy.
An equalization processing circuit according to an exemplary aspect of the present invention includes frequency domain equalization means for performing a frequency domain equalization on a digital signal using an inputted frequency domain equalization coefficient; time domain equalization means for performing a time domain equalization on a digital signal using an inputted time domain equalization coefficient; waveform distortion detection means for detecting a dynamic waveform distortion and a
(Continued)

quasi-static waveform distortion of an equalized digital signal on which the equalization to be performed; frequency domain equalization coefficient control means for calculating a frequency domain equalization coefficient based on a quasi-static waveform distortion; and time domain equalization coefficient control means for calculating a time domain equalization coefficient based on a dynamic waveform distortion.

17 Claims, 17 Drawing Sheets

(51) Int. Cl.
*H04B 10/61* (2013.01)
*H04B 1/04* (2006.01)

(58) Field of Classification Search
USPC .............. 375/232, 343, 346, 348; 398/159
See application file for complete search history.

(56) References Cited

U.S. PATENT DOCUMENTS

| | | |
|---|---|---|
| 2010/0142952 A1 | 6/2010 | Qian et al. |
| 2010/0196017 A1* | 8/2010 | Tanimura ........... H04B 10/6971 398/159 |
| 2013/0084080 A1 | 4/2013 | Shibutani |
| 2013/0183034 A1 | 7/2013 | Zhang et al. |
| 2013/0243420 A1 | 9/2013 | Li et al. |

FOREIGN PATENT DOCUMENTS

| | | |
|---|---|---|
| JP | 2011-009956 A | 1/2011 |
| JP | 2013-081066 A | 5/2013 |
| WO | 2012/029613 A1 | 3/2012 |
| WO | 2013/127467 A1 | 9/2013 |
| WO | 2013/128835 A1 | 7/2015 |

OTHER PUBLICATIONS

International Search Report for PCT Application No. PCT/JP2014/005801 dated Dec. 16, 2014.
English translation of Written opinion for PCT Application No. PCT/JP2014/005801.
Giulio Colavolpe, "Robust Multilevel Coherent Optical Systems With Linear Processing at the Receiver", IEEE Journal of Lightwave Technology, Jul. 2009, pp. 2357-2369, vol. 27, No. 13, IEEE, cited in JPOA.
Japanese Office Action for JP Application No. 2015-552300 dated May 29, 2018 with English Translation.

* cited by examiner

EQUALIZATION PROCESSING CIRCUIT, DIGITAL RECEIVER, SIGNAL TRANSMITTING/RECEIVING SYSTEM, EQUALIZATION PROCESSING METHOD, AND DIGITAL RECEIVING METHOD

This application is a National Stage Entry of PCT/JP2014/005801 filed on Nov. 19, 2014, which claims priority from Japanese Patent Application 2013-254116 filed on Dec. 9, 2013, the contents of all of which are incorporated herein by reference, in their entirety.

TECHNICAL FIELD

The present invention relates to an equalization processing circuit, a digital receiver, a signal transmitting/receiving system, an equalization processing method, and a digital receiving method.

BACKGROUND ART

There has been a problem that it is difficult to perform stable reception in a coherent receiver without digital signal processing due to an offset of the frequency and the phase of the local oscillation light or a polarization fluctuation.

With regard to this, for example, PTL 1 discloses a technique in which, in a coherent receiver, the amount of the frequency shift between a carrier wave frequency of an input signal and the local oscillation light is estimated and the oscillating frequency of the local oscillator (LO) is shifted in a direction opposite to the estimated value.

On the other hand, because of the development of electronic device technologies, it has become possible to use a high-speed A/D (analog to digital) converter for signal processing in a high-speed communication device. As a result, a digital signal has been transmitted and received in optical communication or radio communication. By performing digital signal processing on a signal converted into a digital signal, it is possible to compensate the above-mentioned offset of the frequency and the phase of the LO light or polarization fluctuation of optical signals. In addition to the above-mentioned compensation of the offset of the frequency and the phase or the compensation of the polarization fluctuation, it is also possible to perform a more advanced waveform equalization technique by digital signal processing.

For example, NPL 1 discloses a technique to compensate for various waveform distortions, which are included in received signals, such as chromatic dispersion and polarization mode dispersion based on the analysis results obtained by analyzing transfer characteristics from filter coefficients of a time domain equalization filter. PTL 2 discloses a technique to compensate for a waveform distortion having semi-fixed characteristics varying due to temperature fluctuation in the preceding stage, and compensate for a fast-varying waveform distortion occurring in a transmission line in the subsequent stage. Other related arts are also disclosed in PTL 3, PTL 4, or the like.

CITATION LIST

Patent Literature

[PTL 1] Japanese Patent Application Laid-Open Publication No. 2009-038801
[PTL 2] Japanese Patent Application Laid-Open Publication No. 2011-009956
[PTL 3] Japanese Patent Application Laid-Open Publication No. 2010-268404
[PTL 4] International Publication Number WO2013/128835

Non Patent Literature

[NPL 1] Fabian. N. Hauske, Maxim Kuschnerov, Bernhard Spinnler, and Berthold Lankl, "Optical Performance Monitoring in Digital Coherent Receivers," Journal of Lightwave Technology, vol. 27, No. 16, Aug. 15, 2009.

SUMMARY OF INVENTION

Technical Problem

While the technique of NPL 1 can compensate for various waveform distortions at high speed, it cannot compensate for a waveform distortion having semi-fixed characteristics varying due to temperature fluctuation or the like, for example. Because the technique of PTL 2 compensates for the waveform distortion having semi-fixed characteristics and the waveform distortion varying at high speed in series, the individual accuracy of the compensation decreases.

The present invention has been made in view of the above-described problem, and the object of the present invention is to provide an equalization processing circuit, a digital receiver, a signal transmitting/receiving system, an equalization processing method, and a digital receiving method which make it possible to compensate for a waveform distortion having semi-fixed characteristics and a waveform distortion varying at high speed with a high degree of accuracy.

Solution to Problem

In order to achieve the above-described object, an equalization processing circuit according to an exemplary aspect of the present invention includes frequency domain equalization means for performing a frequency domain equalization on an inputted digital signal using an inputted frequency domain equalization coefficient; time domain equalization means for performing a time domain equalization on the inputted digital signal using an inputted time domain equalization coefficient; waveform distortion detection means for detecting a dynamic waveform distortion and a quasi-static waveform distortion of an equalized digital signal on which the equalization to be performed; frequency domain equalization coefficient control means for calculating and outputting the frequency domain equalization coefficient based on the quasi-static waveform distortion detected; and time domain equalization coefficient control means for calculating and outputting the time domain equalization coefficient based on the dynamic waveform distortion detected.

In order to achieve the above-described object, a digital receiver according to an exemplary aspect of the present invention includes front-end means for coherently detecting an inputted signal using a local oscillator signal and outputting a resultant signal; A/D converting means for converting a coherently detected signal into a digital signal and outputting a resultant signal; and the above-described equalization processing circuit into which the digital signal being inputted.

In order to achieve the above-described object, a signal transmitting and receiving system according to an exemplary aspect of the present invention includes a digital transmitter configured to transmit a signal; and the above-described digital receiver into which the signal transmitted being inputted.

In order to achieve the above-described object, an equalization processing method according to an exemplary aspect of the present invention includes performing a frequency domain equalization on an inputted digital signal using a calculated frequency domain equalization coefficient and performing a time domain equalization on the inputted digital signal using a calculated time domain equalization coefficient; detecting a dynamic waveform distortion and a quasi-static waveform distortion of the digital signal equalized; calculating a frequency domain equalization coefficient based on the quasi-static waveform distortion detected and calculating a time domain equalization coefficient based on the dynamic waveform distortion detected.

In order to achieve the above-described object, a digital receiving method according to an exemplary aspect of the present invention includes coherently detecting an inputted signal using a local oscillator signal and outputting a resultant signal; converting a coherently detected signal into a digital signal and outputting a resultant signal; performing a frequency domain equalization on the digital signal outputted using a calculated frequency domain equalization coefficient, and performing a time domain equalization on the digital signal outputted using a calculated time domain equalization coefficient; detecting a dynamic waveform distortion and a quasi-static waveform distortion of the digital signal equalized; and calculating a frequency domain equalization coefficient based on the quasi-static waveform distortion detected, and calculating a time domain equalization coefficient based on the dynamic waveform distortion detected.

Advantageous Effects of Invention

According to the above-described exemplary aspects of the present invention, it is possible to compensate for a waveform distortion having semi-fixed characteristics and a waveform distortion varying at high speed with a high degree of accuracy.

BRIEF DESCRIPTION OF DRAWINGS

FIG. 1 B is a block configuration diagram of a waveform distortion detection unit 40B in accordance with the first exemplary embodiment.

FIG. 1 C is a block configuration diagram of a waveform distortion detection unit 40C in accordance with the first exemplary embodiment.

DESCRIPTION OF EMBODIMENTS

A First Exemplary Embodiment

Figure 1A:
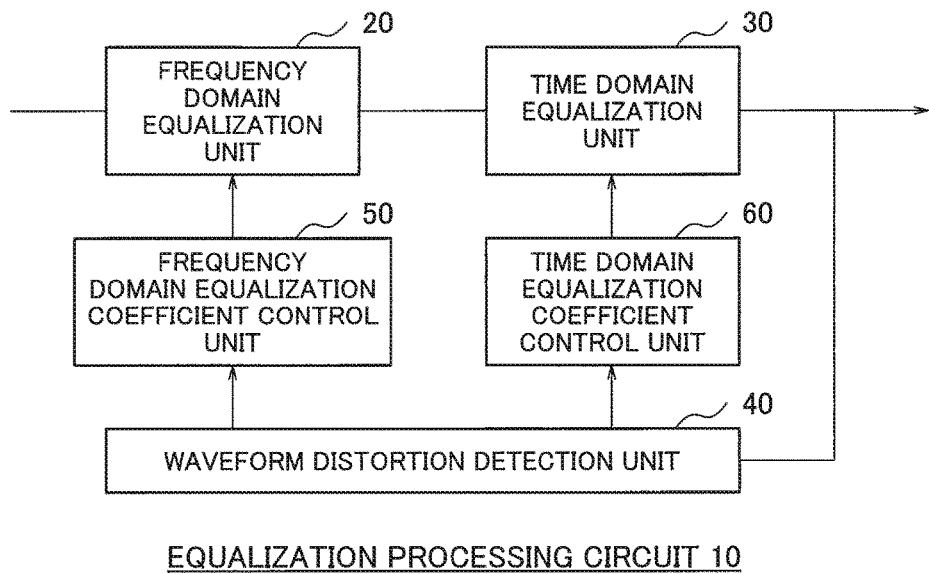
FIG. 1 A is a block configuration diagram of an equalization processing circuit 10 in accordance with a first exemplary embodiment.

A first exemplary embodiment of the present invention will be described. A block configuration diagram of an equalization processing circuit in accordance with the present exemplary embodiment is illustrated in FIG. 1A. In FIG. 1A, the equalization processing circuit 10 includes a frequency domain equalization unit 20, a time domain equalization unit 30, a waveform distortion detection unit 40, a frequency domain equalization coefficient control unit 50, and a time domain equalization coefficient control unit 60. The frequency domain equalization unit 20, the time domain equalization unit 30, the waveform distortion detection unit 40, the frequency domain equalization coefficient control unit 50, and the time domain equalization coefficient control unit 60 correspond to frequency domain equalization means, time domain equalization means, waveform distortion detect means, frequency domain equalization coefficient control means, and time domain equalization coefficient control means in claims, respectively.

The frequency domain equalization unit 20 performs a frequency domain equalization on a digital signal inputted into the equalization processing circuit 10 based on a control by the frequency domain equalization coefficient control unit 50, and outputs a digital signal on which a frequency domain equalization is performed to the time domain equalization unit 30.

The time domain equalization unit 30 performs a time domain equalization on the inputted digital signal based on a control by the time domain equalization coefficient control unit 60, and outputs the digital signal on which the frequency domain equalization and the time domain equalization are performed.

The waveform distortion detection unit 40 detects a waveform distortion from the digital signal on which the frequency domain equalization and the time domain equalization are performed, and separates the waveform distortion into a quasi-static waveform distortion and a dynamic waveform distortion. The waveform distortion detection unit 40 outputs the quasi-static waveform distortion to the frequency domain equalization coefficient control unit 50 and outputs the dynamic waveform distortion to the time domain equalization coefficient control unit 60.

The frequency domain equalization coefficient control unit 50 calculates a frequency domain equalization coefficient for compensating the quasi-static waveform distortion based on the quasi-static waveform distortion inputted from the waveform distortion detection unit 40, and controls the frequency domain equalization unit 20 by feedback based on the calculated frequency domain equalization coefficient.

The time domain equalization coefficient control unit 60 calculates a time domain equalization coefficient for compensating the dynamic waveform distortion based on the dynamic waveform distortion inputted from the waveform distortion detection unit 40, and controls the time domain equalization unit 30 by feedback based on the calculated time domain equalization coefficient.

In the equalization processing circuit 10 configured as described above, the waveform distortion detection unit 40 separates a waveform distortion of a digital signal on which the frequency domain equalization and the time domain equalization are performed into a quasi-static waveform distortion and a dynamic waveform distortion, which are output to the frequency domain equalization coefficient control unit 50 and the time domain equalization coefficient control unit 60, respectively. The frequency domain equalization coefficient control unit 50 controls the frequency domain equalization unit 20 by feedback based on the quasi-static waveform distortion, and the time domain equalization coefficient control unit 60 controls the time domain equalization unit 30 by feedback based on the dynamic waveform distortion.

By controlling the frequency domain equalization unit 20 by feedback based on the quasi-static waveform distortion into which the dynamic waveform distortion is separated, the frequency domain equalization coefficient control unit 50 can perform the frequency domain equalization with a high degree of accuracy taking a relatively long time.

If the time domain equalization unit 30 is controlled by feedback based on the dynamic waveform distortion with the quasi-static waveform distortion being separated, it is possible to reduce a processing load of the time domain equalization coefficient control unit 60 which needs controlling at high speed.

Figure 1B:
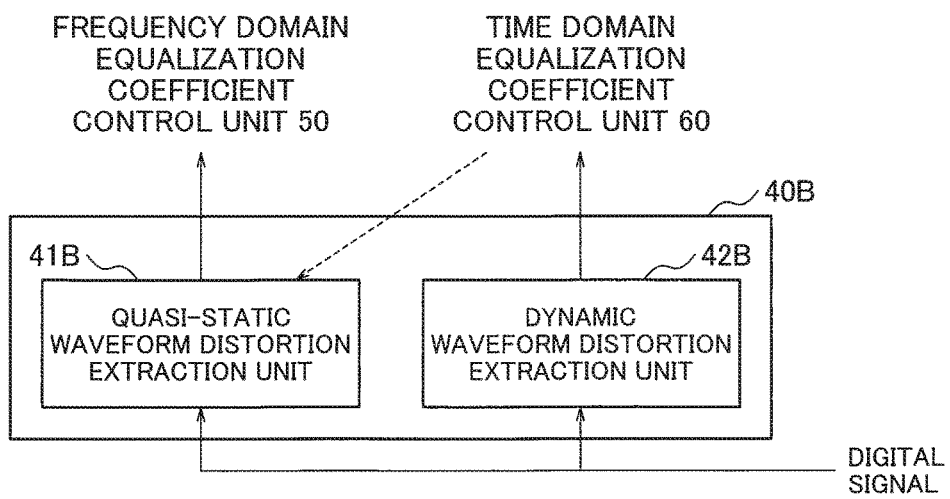
Figure 1C:
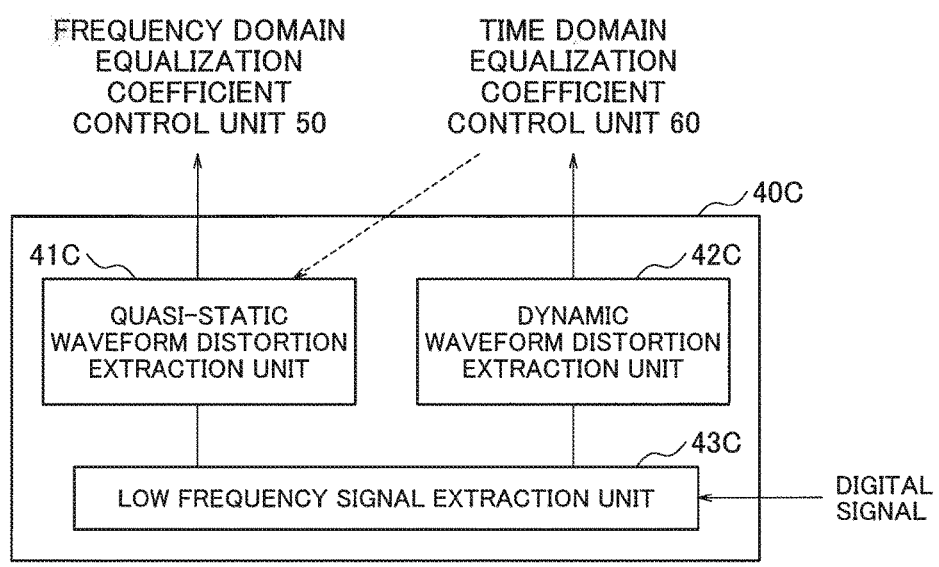

Here, examples of the waveform distortion detection unit 40 according to the present exemplary embodiment are illustrated in FIG. 1B and FIG. 1C. A waveform distortion detection unit 40B illustrated in FIG. 1 B includes a quasi-static waveform distortion extraction unit 41B and a dynamic waveform distortion extraction unit 42B. The quasi-static waveform distortion extraction unit 41B extracts a quasi-static waveform distortion from a digital signal on which the equalization processing is performed. On the other hand, the dynamic waveform distortion extraction unit 42B extracts a dynamic waveform distortion from a digital signal on which the equalization processing is performed.

It is preferable that the time domain equalization coefficient control unit 60 should output the calculated time domain equalization coefficient to the quasi-static waveform distortion extraction unit 41B (dotted arrow) and that the quasi-static waveform distortion extraction unit 41B should extract the quasi-static waveform distortion referring to the time domain equalization coefficient. This makes it possible to reduce the processing load in the quasi-static waveform distortion extraction unit 41B.

A waveform distortion detection unit 40C illustrated in FIG. 1C includes a low frequency signal extraction unit 43C, a quasi-static waveform distortion extraction unit 41C, and a dynamic waveform distortion extraction unit 42C. The low frequency signal extraction unit 43C extracts a low frequency signal from a digital signal on which an equalization processing is performed, outputs the low frequency signal to the quasi-static waveform distortion extraction unit 41C, and outputs the remainder to the dynamic waveform distortion extraction unit 42C. The quasi-static waveform distortion extraction unit 41C extracts a quasi-static waveform distortion from the low frequency signal inputted from the low frequency signal extraction unit 43C. On the other hand, the dynamic waveform distortion extraction unit 42C extracts a dynamic waveform distortion from a digital signal which is inputted from the low frequency signal extraction unit 43C and is obtained by removing the low frequency signal.

Here, if a high speed control is prioritized, the low frequency signal extraction unit 43C can output digital signals as it is on which an equalization processing is performed to the dynamic waveform distortion extraction unit 42C. In this case, the dynamic waveform distortion extraction unit 42C extracts a dynamic waveform distortion from the inputted digital signals.

As described above, in the equalization processing circuit 10 in accordance with the present exemplary embodiment, the waveform distortion detection units 40, 40B, and 40C separate waveform distortions included in the digital signals on which the equalization processing is performed into a quasi-static waveform distortion and a dynamic waveform distortion, and output the quasi-static waveform distortion and the dynamic waveform distortion to the frequency domain equalization coefficient control unit 50 and the time domain equalization coefficient control unit 60, respectively. The frequency domain equalization coefficient control unit 50 calculates a frequency domain equalization coefficient based on the separated quasi-static waveform distortion, and the time domain equalization coefficient control unit 60 calculates a time domain equalization coefficient based on the separated dynamic waveform distortion.

By calculating the frequency domain equalization coefficient based on the quasi-static waveform distortion obtained by separating the dynamic waveform distortion, the frequency domain equalization coefficient control unit 50 can perform the processing with a high degree of accuracy taking a relatively long time. Further, by calculating the time domain equalization coefficient based on the dynamic waveform distortion obtained by separating the quasi-static waveform distortion, it is possible to reduce the processing load in the time domain equalization coefficient control unit 60.

The equalization processing circuit 10 in accordance with the present exemplary embodiment, therefore, makes it possible to compensate for a waveform distortion having semi-fixed characteristics (a quasi-static waveform distortion) and a waveform distortion varying at high speed (a dynamic waveform distortion) with a high degree of accuracy.

A Second Exemplary Embodiment

Figure 2:
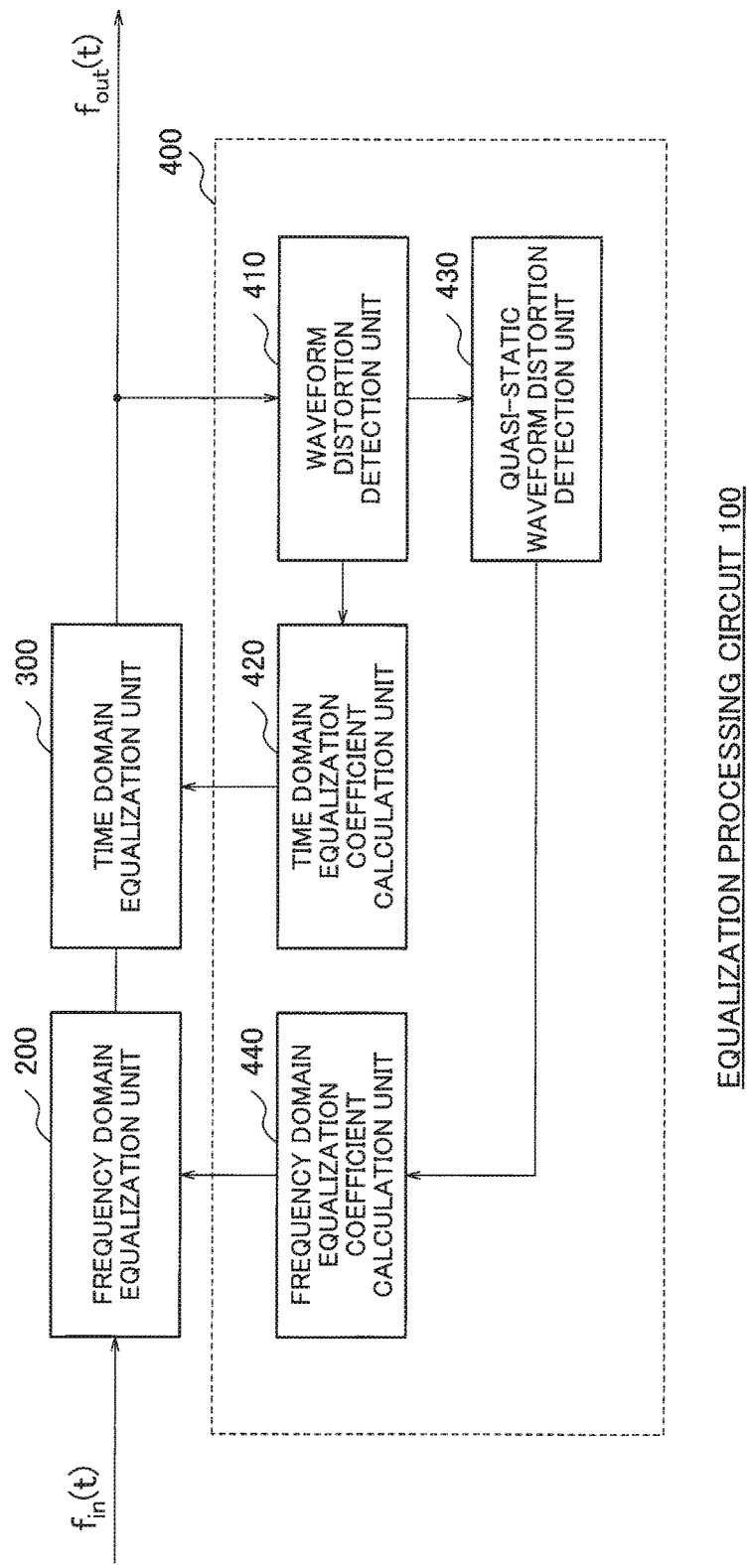
FIG. 2 is a block configuration diagram of an equalization processing circuit 100 in accordance with a second exemplary embodiment.

A second exemplary embodiment will be described. A block configuration diagram of an equalization processing circuit in accordance with the present exemplary embodiment is illustrated in FIG. 2. In FIG. 2, an equalization processing circuit 100 includes a frequency domain equalization unit 200, a time domain equalization unit 300, and a feedback control unit 400.

The frequency domain equalization unit 200 performs a frequency domain equalization (FDE) on a digital signal inputted into the equalization processing circuit 100 using a frequency domain equalization coefficient inputted from a frequency domain equalization coefficient calculation unit 440, which is output to the time domain equalization unit 300. FIG. 3A illustrates a block configuration diagram of the frequency domain equalization unit 200 in accordance with the present exemplary embodiment.

Figure 3:
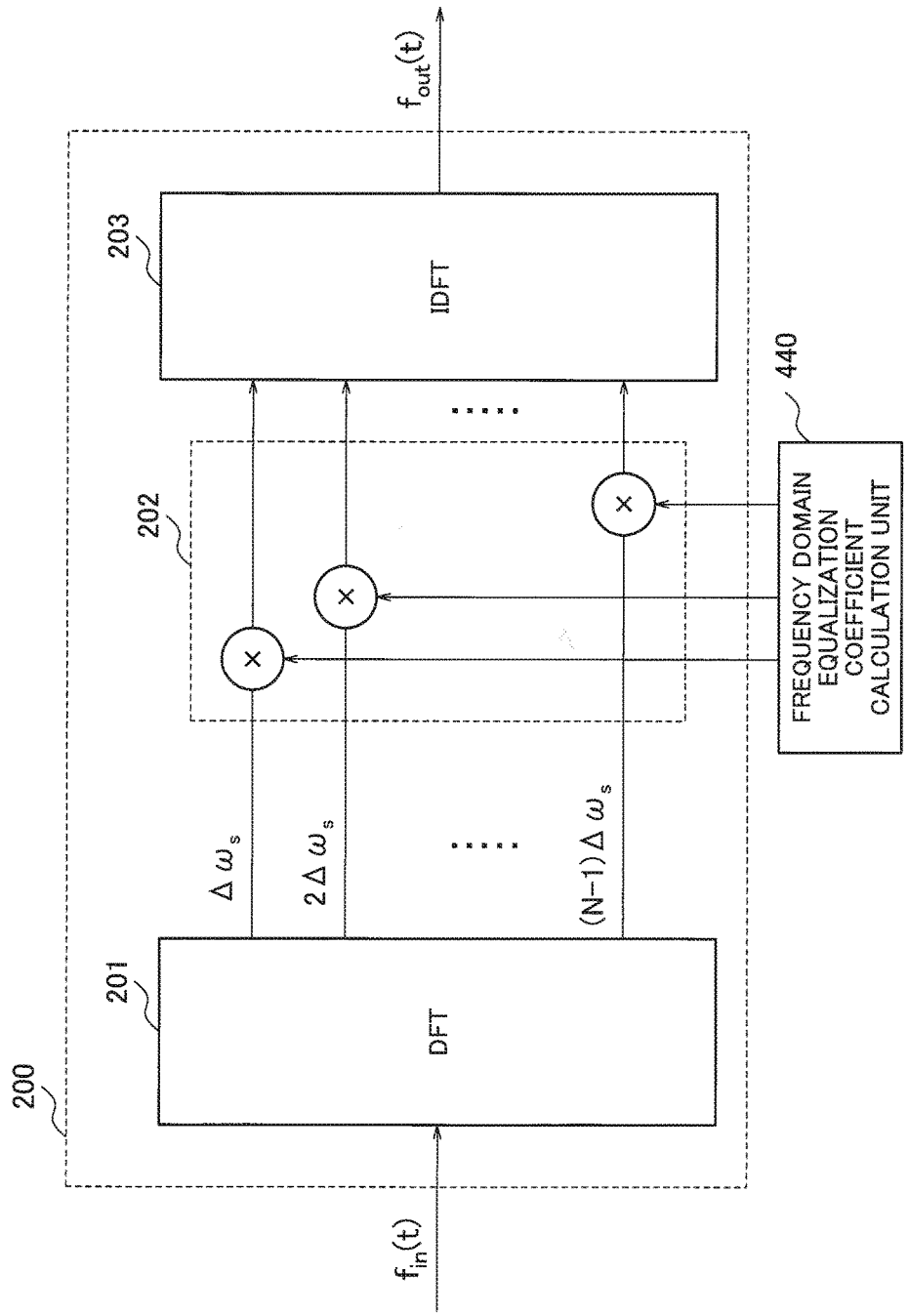
FIG. 3 is a block configuration diagram of a frequency domain equalization unit 200 in accordance with the second exemplary embodiment.

In FIG. 3, the frequency domain equalization unit 200 includes a discrete Fourier transform unit (DFT) 201, a multiplier 202, and an inverse discrete Fourier transform unit (IDFT) 203.

The DFT201 performs a discrete Fourier transform on a digital signal inputted into the frequency domain equalization unit 200, and outputs N frequency domain signals $\Delta\omega_{s0}$ to $\Delta\omega_{s(N-1)}$ to the multiplier 202. Here, the transformed digital signals are at a regular frequency interval $\Delta\omega_s$, where $\Delta\omega_s = 2\pi f_s/N$, and $f_s$ represents a sampling frequency. That is to say, $\Delta\omega_{sk}$ represents a signal with a frequency of $k \cdot \Delta\omega_s$ ($k=0$ to $(N-1)$) in the present exemplary embodiment.

Here, as the discrete Fourier transform size N becomes larger, a waveform equalization with a high degree of accuracy is performed. In a general FDE applied to an orthogonal frequency-division multiplexing (OFDM) modulation method or an optical digital coherent communication or the like, as the size N becomes larger, a circuit size becomes larger to deal with a complex control, and the power consumption increases.

The multiplier 202 multiplies each of N frequency domain signals $\Delta\omega_{s0}$ to $\Delta\omega_{s(N-1)}$ inputted from the DFT201 by a frequency domain equalization coefficient inputted from the frequency domain equalization coefficient calculation unit 440, and outputs the multiplied results to the IDFT203.

The IDFT203 performs an inverse discrete Fourier transform on the multiplied results (N signals on which a frequency domain equalization is performed) inputted from the multiplier 202 to be transformed into a time domain signal, and outputs the time domain signal to the time domain equalization unit 300.

Here, the discrete Fourier transform size N in general is a power-of-two integer. In this case, a Fast Fourier transform (FFT) can be used as an algorithm for performing the discrete Fourier transform. In this case, the frequency domain equalization unit 200 can implement the frequency domain equalization by performing the FFT on the inputted signal and performing a weighted multiplication using filter coefficient set values as many as the size of the FFT in the multiplier 202. The frequency domain equalization unit 200 then performs an inverse Fast Fourier transform (IFFT) on a signal on which the frequency domain equalization is performed, to be transformed into a time domain signal, and outputs the time domain signal to the time domain equalization unit 300.

If an FFT is applied to an FDE circuit, it is possible to prevent a circuit size and power consumption from increasing even when N increases to perform a waveform equalization with a high degree of accuracy. The frequency domain equalization unit 200, therefore, is an FDE circuit with smaller circuit size and lower power consumption compared with a time domain equalization circuit whose circuit size is proportionate to N.

Returning to the description of FIG. 2, the time domain equalization unit 300 performs a time domain equalization on the digital signal on which the frequency domain equalization is performed and which is inputted from the frequency domain equalization unit 200 using a time domain equalization coefficient inputted from a time domain equalization coefficient calculation unit 420, and outputs the equalized signal. The time domain equalization unit 300 can be composed of a highly controllable FIR (finite impulse response) filter or IIR (infinite impulse response) filter, for example. In this case, the time domain equalization coefficient inputted from the time domain equalization coefficient calculation unit 420 is applied to the coefficients of the FIR filter and the IIR filter.

The feedback control unit 400 controls by feedback the frequency domain equalization unit 200 and the time domain equalization unit 300. As illustrated in FIG. 2, the feedback control unit 400 in accordance with the present exemplary embodiment includes a waveform distortion detection unit 410, the time domain equalization coefficient calculation unit 420, a quasi-static waveform distortion detection unit 430, and the frequency domain equalization coefficient calculation unit 440.

A part of digital signals output from the time domain equalization unit 300 is inputted into the waveform distortion detection unit 410. The waveform distortion detection unit 410 detects a waveform distortion of the inputted digital signal and outputs the detected results to the time domain equalization coefficient calculation unit 420 and the quasi-static waveform distortion detection unit 430. The waveform distortion detection unit 410 in accordance with the present exemplary embodiment determines an error between a reference signal, such as a fixed value, a training signal, and a decision-directed (DD) signal, and the digital signal inputted from the time domain equalization unit 300, and detects a waveform distortion by performing an error signal calculation depending on each waveform equalization (compensation) algorithm.

The time domain equalization coefficient calculation unit 420 calculates a time domain equalization coefficient based on the waveform distortion inputted from the waveform distortion detection unit 410 and outputs the calculated results to the time domain equalization unit 300. The time domain equalization coefficient calculation unit 420 in accordance with the present exemplary embodiment calculates the time domain equalization coefficient by a waveform equalization algorithm selected depending on system requirements.

Here, it is possible to use common methods as the waveform equalization algorithm such as the CMA (constant modulus algorithm), the LMS (least mean squares) algorithm, and the RLS (recursive least squares) algorithm. Instead of using the waveform equalization algorithm, it is also possible for the waveform distortion detection unit 410 to detect as an error signal a deviation amount (a distortion) from an ideal waveform at the time when transmission characteristics such as an eye aperture ratio and an error rate are optimized, and for the time domain equalization coefficient calculation unit 420 to calculate a time domain equalization coefficient with which the amount of the detected error is minimized.

The quasi-static waveform distortion detection unit 430 extracts a waveform distortion time-varying slowly from waveform distortions inputted from the waveform distortion detection unit 410, and outputs it to the frequency domain equalization coefficient calculation unit 440. Here, a distortion signal time-varying slowly means a waveform distortion signal having longer-term temporal variation than a feedback time constant of the time domain equalization composed of the time domain equalization unit 300, the waveform distortion detection unit 410, and the time domain equalization coefficient calculation unit 420. The quasi-static waveform distortion detection unit 430 in accordance with the present exemplary embodiment detects, as a quasi-static waveform distortion, a deviation amount time-varying slowly out of a deviation amount (an error) between the inputted digital signal and a reference signal, and a deviation amount from an ideal waveform (a waveform at the time when transmission characteristics are optimized) of the inputted digital signal.

The frequency domain equalization coefficient calculation unit 440 calculates a frequency domain equalization coefficient of the frequency domain equalization unit 200 based on the quasi-static waveform distortion detected in the quasi-static waveform distortion detection unit 430, and outputs the calculated results to the frequency domain equalization unit 200. The frequency domain equalization coefficient calculation unit 440 in accordance with the present exemplary embodiment calculates the frequency domain equalization coefficient by a waveform equalization algorithm selected depending on system requirements.

In the equalization processing circuit 100 configured as described above, the feedback control unit 400 calculates the time domain equalization coefficient based on the waveform distortion of inputted digital signals, and controls the time domain equalization unit 300 by feedback. A highly controllable circuit with high circuit efficiency such as an FIR filter is applied to the time domain equalization unit 300, and the time domain equalization coefficient inputted from the feedback control unit 400 is applied to the coefficient of an FIR filter. This makes it possible to perform the time domain equalization fast on a waveform distortion having high-speed temporal variation with low power consumption.

On the other hand, in the equalization processing circuit 100 configured as described above, the feedback control unit 400 extracts a quasi-static waveform distortion from waveform distortions of inputted digital signals, calculates a frequency domain equalization coefficient based on the quasi-static waveform distortion, and controls the frequency domain equalization unit 200 by feedback. FFT, IFFT, and the like which can prevent a circuit size from increasing are applied to the frequency domain equalization unit 200, and the frequency domain equalization coefficient inputted from the feedback control unit 400 is added to an output from the FFT, respectively. The frequency domain equalization unit 200, therefore, can perform the frequency domain equalization on a waveform distortion time-varying slowly with a high degree of accuracy, preventing a circuit size from increasing, that is, preventing power consumption from increasing.

Here, in the present exemplary embodiment, the quasi-static waveform distortion detection unit 430 is arranged in the stage subsequent to the waveform distortion detection unit 410, and the quasi-static waveform distortion detection unit 430 extracts a waveform distortion time-varying slowly from waveform distortions output from the waveform distortion detection unit 410, to which the present invention is not limited. The quasi-static waveform distortion detection unit 430 can be arranged at a preferable detecting position depending on an equalization algorithm such as a feedforward control and a feedback control. That is to say, in order to detect the waveform distortion time-varying slowly, signals can also be used which are branched at the preceding stage or the subsequent stage of the frequency domain equalization unit 200 or at the preceding stage of the time domain equalization unit 300.

Figure 4:
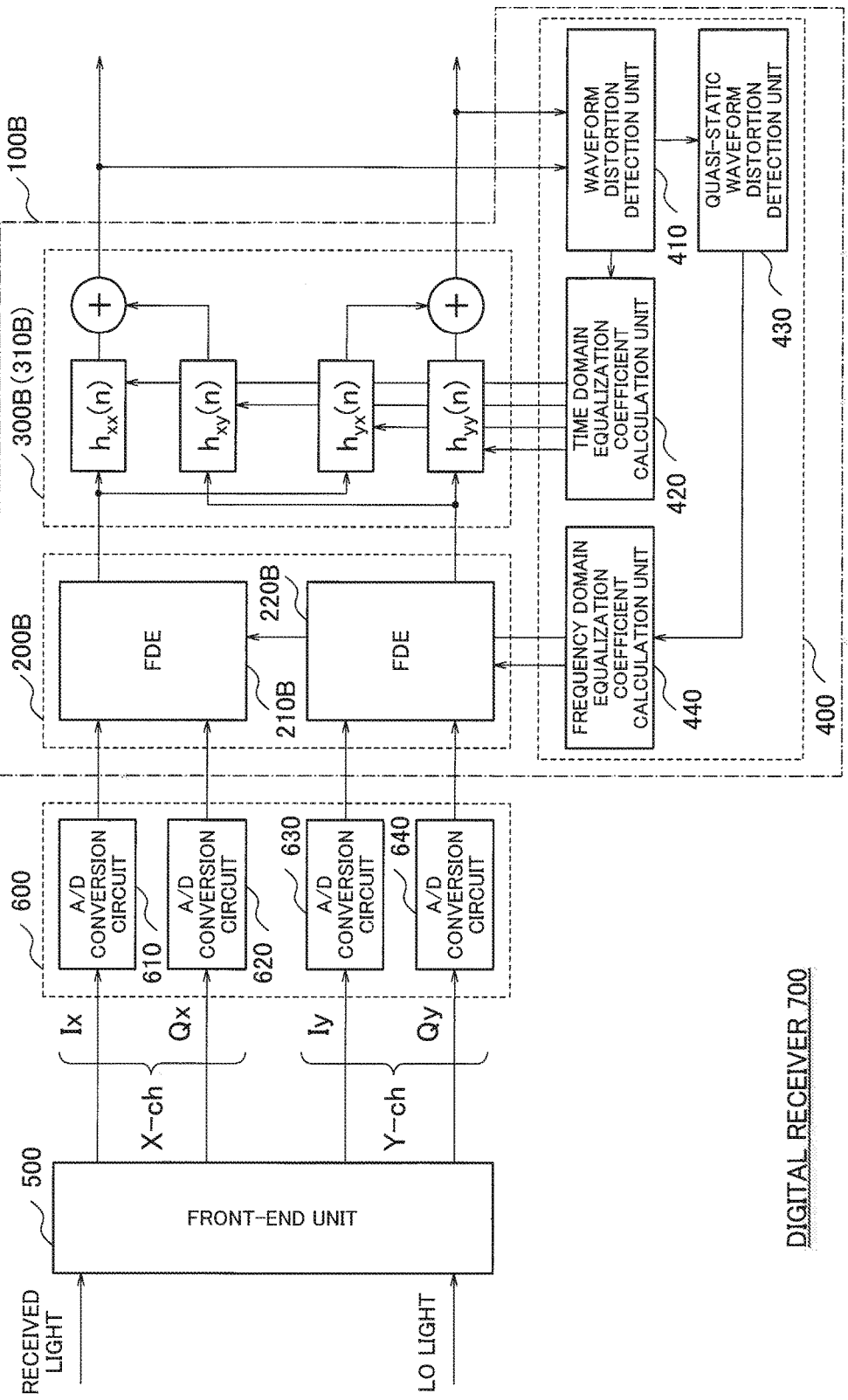
FIG. 4 is a block configuration diagram of a digital receiver 700 in accordance with the second exemplary embodiment.

The above-described equalization processing circuit can be included in a digital receiver which processes optically polarization multiplexed phase modulation signals such as DP-QPSK (dual-polarization quadrature phase shift keying) signals, for example. FIG. 4 illustrates a block configuration diagram of a digital receiver including the above-described equalization processing circuit. In FIG. 4, a digital receiver 700 includes a front-end unit 500, an A/D (Analog to Digital) conversion unit 600, and an equalization processing circuit 100B. Here, the equalization processing circuit 100B includes a frequency domain equalization unit 200B, a time domain equalization unit 300B, and a feedback control unit 400.

Figure 5:
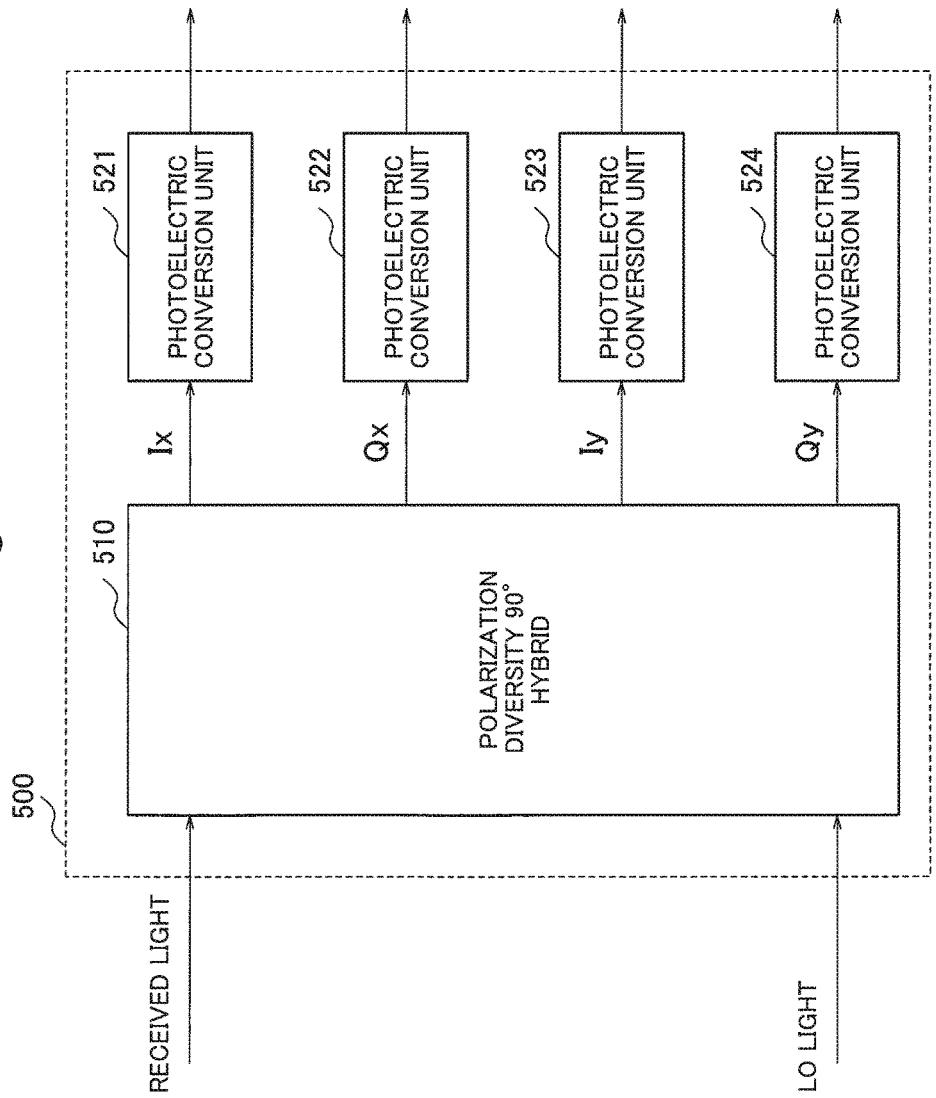
FIG. 5 is a block configuration diagram of a front-end unit 500 of the digital receiver 700.

The front-end unit 500 receives polarization multiplexed QPSK signals inputted into the digital receiver 700 and local oscillation light output from a local oscillation light source not shown in the figure. The front-end unit 500 coherently detects the inputted polarization multiplexed QPSK signals using the LO light and outputs four components of Ix, Qx, Iy, and Qy corresponding to an in-phase component (I) and a quadrature component (Q) of two kinds of the polarization (X, Y). FIG. 5 illustrates an example of a block configuration diagram of the front-end unit 500.

In FIG. 5, the front-end unit 500 includes a polarization diversity 90-degree hybrid 510 and photoelectric conversion units 521, 522, 523, and 524.

The polarization diversity 90-degree hybrid 510 coherently detects inputted polarization multiplexed QPSK signals using the LO light, demodulates the signals into four components of Ix, Qx, Iy, and Qy, and outputs the components to the photoelectric conversion units 521, 522, 523, and 524, respectively.

The photoelectric conversion units 521, 522, 523, and 524 convert the inputted four components of Ix, Qx, Iy, and Qy into electric signals respectively, and outputs the electric signals to the A/D conversion unit 600.

The A/D conversion unit 600 is composed of four A/D conversion circuits 610, 620, 630, and 640. The A/D conversion unit 600 converts four components of Ix, Qx, Iy, and Qy inputted from the front-end unit 500 into digital signals respectively, and outputs digital signals of Ix and Qx to an FDE 210B and digital signals of Iy and Qy to an FDE 220B.

The frequency domain equalization unit 200B is composed of the FDE 210B and the FDE 220B. The FDE 210B performs the frequency domain equalization on the inputted digital signals of Ix and Qx using frequency domain equalization coefficients inputted from the frequency domain equalization coefficient calculation unit 440, and outputs the equalized signals to the time domain equalization unit 300B. Similarly, the FDE 220B performs the frequency domain equalization on the inputted digital signals of Iy and Qy using frequency domain equalization coefficients inputted from the frequency domain equalization coefficient calculation unit 440, and outputs the equalized signals to the time domain equalization unit 300B.

The time domain equalization unit 300B is made up of a butterfly FIR filter 310B. The butterfly FIR filter 310B performs the time domain equalization on the inputted signal on which the frequency domain equalization is performed, using time domain equalization coefficients inputted from the time domain equalization coefficient calculation unit 420, and outputs the equalized signals.

The feedback control unit 400 illustrated in FIG. 2 is directly applicable to the feedback control unit 400. That is to say, the feedback control unit 400 outputs frequency domain equalization coefficients calculated based on a waveform distortion time-varying slowly to the frequency domain equalization unit 200B, and outputs time domain equalization coefficients calculated based on a waveform distortion having high-speed temporal variation to the time domain equalization unit 300B.

Figure 6:
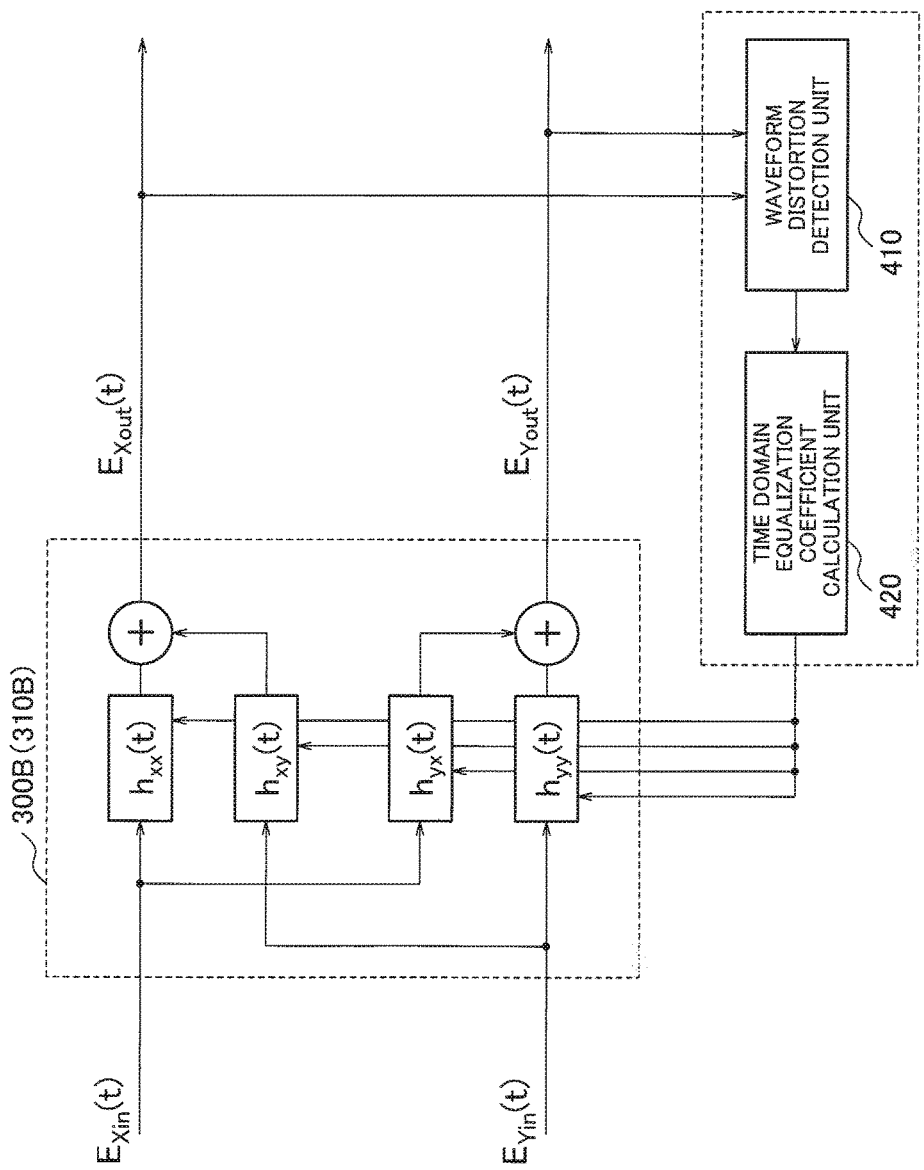
FIG. 6 is a diagram for illustrating the operation of a butterfly FIR filter 310B and feedback control unit 400 in the digital receiver 700.

The operations of the butterfly FIR filter 310B and the feedback control unit 400 will be described with reference to FIG. 6 if the time domain equalization unit 300B is configured by the butterfly FIR filter 310B. In FIG. 6, $E_{Xin}(t)$ and $E_{Yin}(t)$ represent input signals into an X-polarization port and input signals into a Y-polarization port respectively which are inputted into the butterfly FIR filter 310B at time t (t-th sample). $E_{Xout}(t)$ and $E_{Yout}(t)$ represent output signals from the X-polarization port and output signals from the Y-polarization port respectively which are output from the butterfly FIR filter 310B at time t. Each of $h_{xx}(t)$, $h_{xy}(t)$, $h_{yx}(t)$, and $h_{yy}(t)$ represents a filter coefficient of the butterfly FIR filter 310B at time t. An example will be described below for simplicity's sake in which the number of taps of the butterfly FIR filter 310B is one.

In this case, the relationship between input and output signals of the butterfly FIR filter 310B is given by the following formula (1).

$$\begin{pmatrix} E_{Xout}(t) \\ E_{Yout}(t) \end{pmatrix} = \begin{pmatrix} h_{xx}(t) & h_{xy}(t) \\ h_{yx}(t) & h_{yy}(t) \end{pmatrix} \begin{pmatrix} E_{Xin}(t) \\ E_{Yin}(t) \end{pmatrix}. \quad \text{formula (1)}$$

If the CMA (constant modulus algorithm) is used as a waveform equalization algorithm, for example, the waveform distortion detection unit 410 calculates error signals expressed in formula (2).

$$e_X(t) = 1 - |E_{Xout}(t)|^2$$

$$e_Y(t) = 1 - |E_{Yout}(t)|^2 \quad \text{formula (2)}.$$

The time domain equalization coefficient calculation unit 420 then calculates tap coefficients of the butterfly FIR filter 310B at time t+1 using formula (3), and outputs them to the butterfly FIR filter 310B as time domain equalization coefficients.

$$h_{xx}(t+1) = h_{xx}(t) + \mu e_X(t) E_{Xout}(t) E^*_{Xin}(t)$$

$$h_{xy}(t+1) = h_{xy}(t) + \mu e_X(t) E_{Xout}(t) E^*_{Yin}(t)$$

$$h_{yx}(t+1) = h_{yx}(t) + \mu e_Y(t) E_{Yout}(t) E^*_{Xin}(t)$$

$$h_{yy}(t+1) = h_{yy}(t) \mu e_Y(t) E_{Yout}(t) E^*_{Yin}(t) \quad \text{formula (3)}$$

Here, μ represents a step size parameter, and * represents a complex conjugate.

The feedback control unit 400 sequentially updates the coefficients of the butterfly FIR filter 310B following the above-described procedure. The butterfly FIR filter 310B then performs the time domain equalization using the coefficients updated sequentially. This makes the waveform compensated adaptively even though the polarization temporally varies.

As described above, it is possible to output a highly controllable waveform with a high degree of accuracy and with low power consumption even though polarization multiplexed QPSK signals are inputted into the digital receiver 700.

Figure 7:
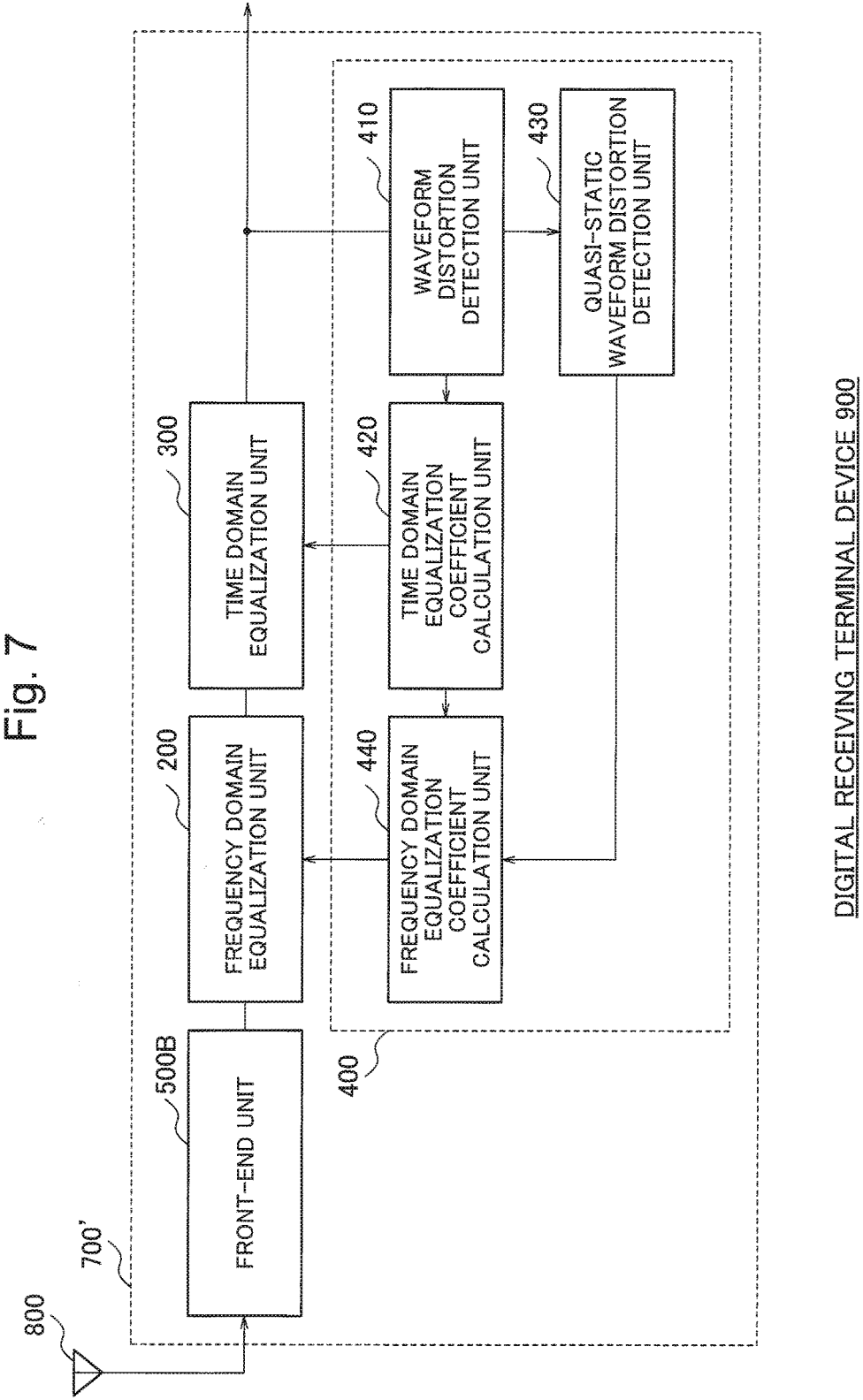
FIG. 7 is a block configuration diagram of a digital receiving terminal device 900 in accordance with the second exemplary embodiment.

Here, the above-described digital receiver 700 illustrated in FIG. 4 can be applied to a digital receiving terminal device for wireless communication. FIG. 7 illustrates a block configuration diagram of a digital receiving terminal device in this case. In FIG. 7, a digital receiving terminal device 900 is composed of an antenna 800 and a digital receiving unit 700'.

The antenna 800 receives signals transmitted wirelessly and outputs the received signals to the digital receiving unit 700'. The digital receiving unit 700' coherently detects the inputted signals in a front-end unit 500B.

The coherently detected signals are inputted into the frequency domain equalization unit 200. The frequency domain equalization unit 200 and the time domain equalization unit 300 perform the frequency domain equalization and the time domain equalization on the signals inputted into the frequency domain equalization unit 200 based on frequency domain equalization coefficients and time domain equalization coefficients calculated in the feedback control unit 400.

Figure 8:
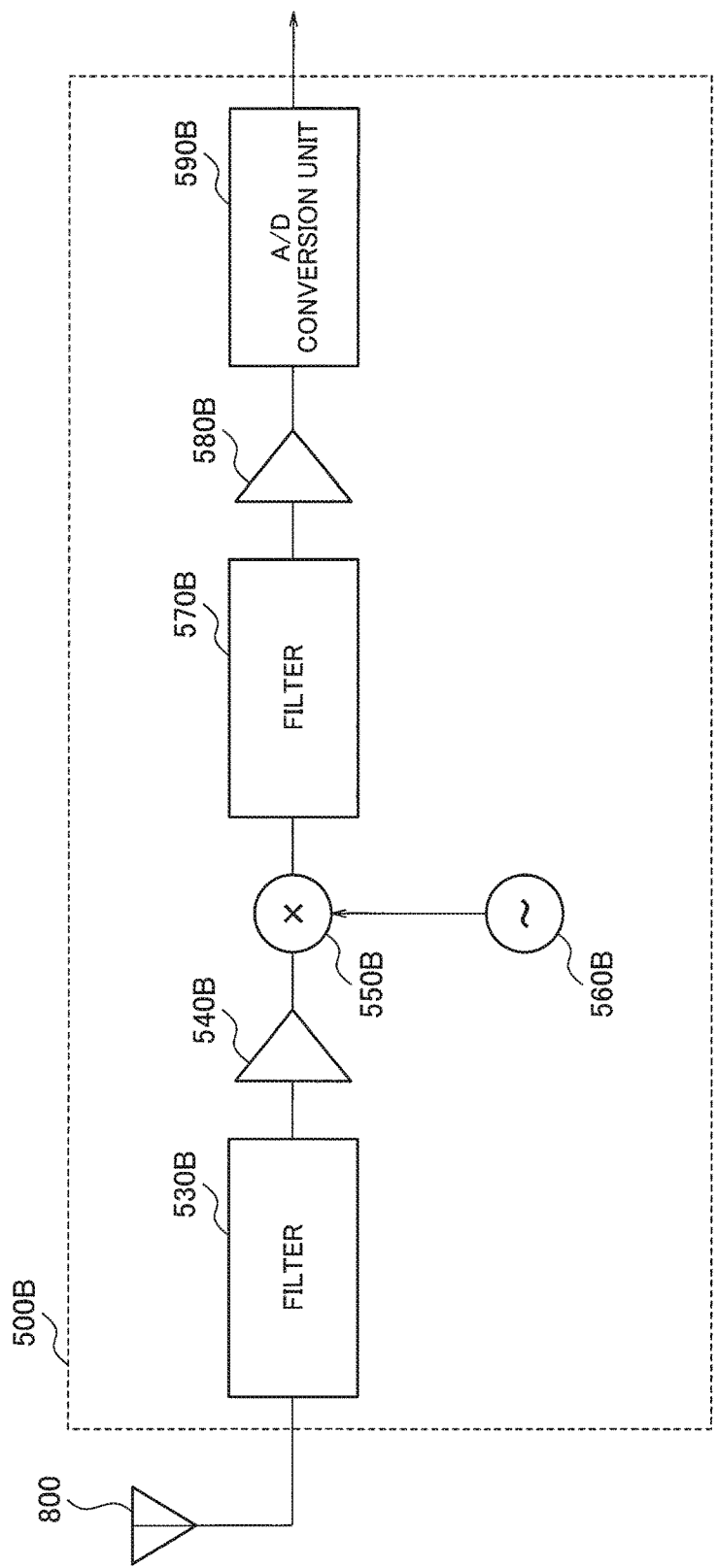
FIG. 8 is a block configuration diagram of a front-end unit 500B in the digital receiving terminal device 900 in accordance with the second exemplary embodiment.

Here, the front-end unit 500B illustrated in FIG. 7 also has the function of the A/D conversion unit 600 illustrated in FIG. 4. FIG. 8 illustrates a block configuration diagram of the front-end unit 500B. In FIG. 8, the front-end unit 500B includes a filter 530B, a low noise amplifier 540B, a mixer 550B, a reference signal source 560B, a filter 570B, a variable gain amplifier 580B, and an A/D conversion unit 590B.

The filter 530B eliminates frequency components to be noise from the received signals by the antenna 800 and outputs analog signals to the low noise amplifier 540B. The low noise amplifier 540B amplifies the inputted analog signals and outputs the amplified signals to the mixer 550B. The mixer 550B multiplies the analog signals inputted from the low noise amplifier 540B by a reference signal generated by the reference signal source 560B and outputs the multiplied signals to the filter 570B. The filter 570B eliminates frequency components to be noise from the inputted analog signals and outputs the resultant signals to the variable gain amplifier 580B. The variable gain amplifier 580B amplifies the inputted analog signals and outputs the amplified signals to the A/D conversion unit 590B. The A/D conversion unit 590B converts the inputted analog signals into digital signals and outputs the digital signals.

Here, it is not necessarily required that the front-end unit 500B includes the filter 530B, the low noise amplifier 540B, the mixer 550B, the reference signal source 560B, the filter 570B, and the variable gain amplifier 580B. For example, the A/D conversion unit 590B in the front-end unit 500B can directly convert the signals received by the antenna 800 into digital signals and output the digital signals.

The above-described digital receiving terminal device 900 performs the frequency domain equalization on the waveform distortion time-varying slowly of waveform distortions included in the input signal using the frequency domain equalization unit 200 which can perform the waveform equalization having high circuit efficiency with a high degree of accuracy, and performs the time domain equalization on the waveform distortion having high-speed temporal variation using the time domain equalization unit 300 which is highly controllable. In this case, it is possible to output a highly controllable waveform with a high degree of accuracy and with low power consumption.

Figure 9:
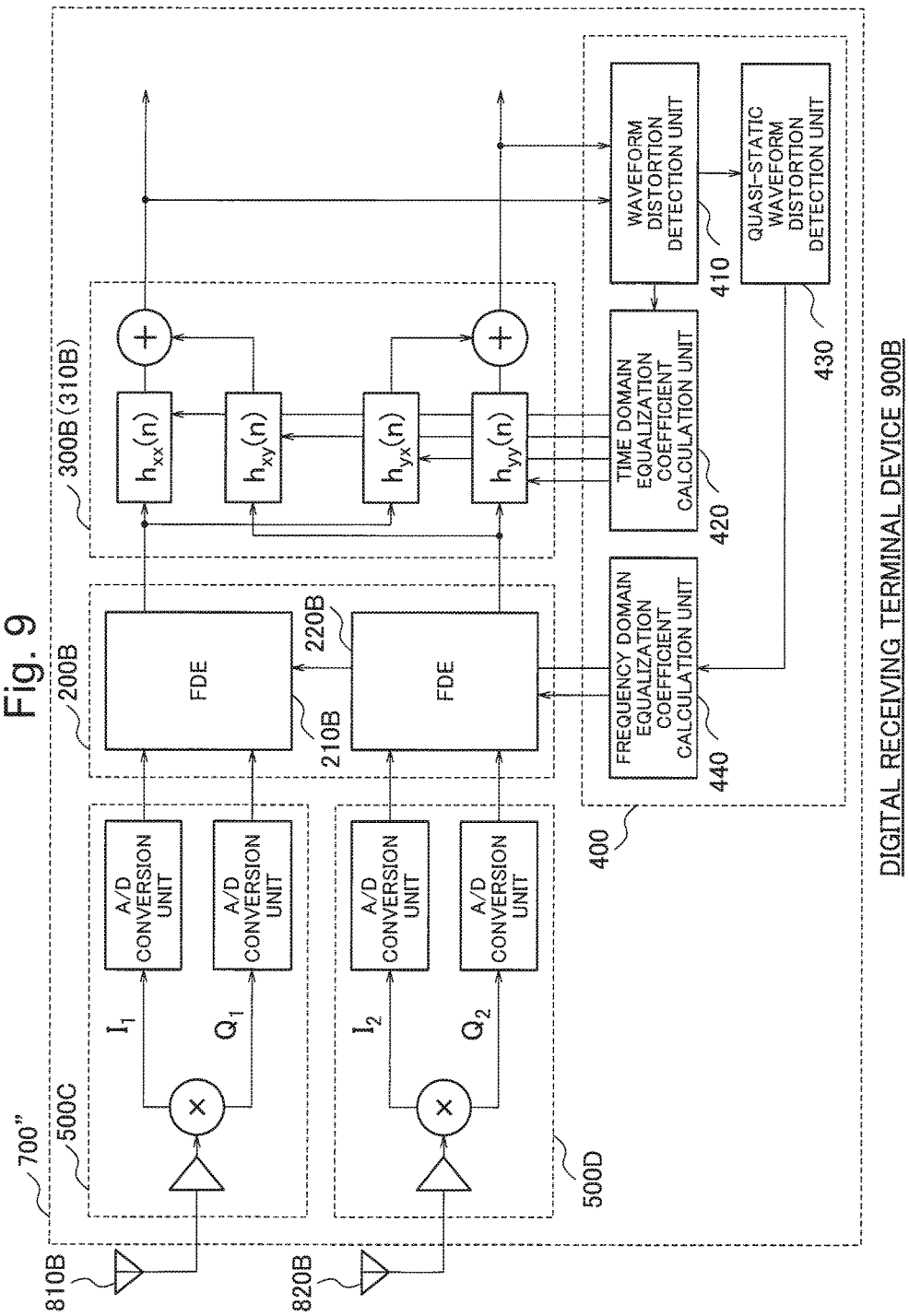
FIG. 9 is a block configuration diagram of another digital receiving terminal device 900B in accordance with the second exemplary embodiment.

The digital receiver 700 illustrated in FIG. 4 can be applied to a digital receiving terminal device for wireless communication using a MIMO (Multiple Input Multiple Output) method. FIG. 9 illustrates a block configuration diagram of a digital receiving terminal device in this case.

In FIG. 9, a digital receiving terminal device 900B includes antennas 810B, 820B and a digital receiving unit 700". The digital receiving unit 700" is obtained by replacing the front-end unit 500 and the A/D conversion unit 600 in the digital receiver 700 illustrated in FIG. 4 with front-end units 500C and 500D.

The antennas 810B and 820B receive signals transmitted wirelessly and output the received signals to the front-end units 500C and 500D in the digital receiving unit 700", respectively. The front-end units 500C and 500D extract real number components ($I_n$) and imaginary number components ($Q_n$) from the signals inputted from the antennas 810B and 820B, respectively, perform A/D conversion on the signals, and output the digital signals.

The FDE 210B and the FDE 220B perform the frequency domain equalization on the waveform distortion time-varying slowly included in the signal output from the front-end units 500C and 500D based on frequency domain equalization coefficients inputted from the frequency domain equalization coefficient calculation unit 440. Further, the butterfly FIR filter 310B performs the time domain equalization on the waveform distortion having high-speed temporal variation included in the signal output from the FDE 210B, 220B based on time domain equalization coefficients inputted from the time domain equalization coefficient calculation unit 420.

According to the present exemplary embodiment, the frequency domain equalization is performed on the waveform distortion time-varying slowly of the waveform distortions included in the input signal using the FDEs 210B and 220B which can perform the waveform equalization having high circuit efficiency with a high degree of accuracy, and the time domain equalization is performed on the waveform distortion having high-speed temporal variation using the butterfly FIR filter 310B which is highly controllable. This makes it possible to output a highly controllable waveform with a high degree of accuracy and with low power consumption even in the digital receiving terminal device 900B which is used for wireless communication using the MIMO method.

Figure 10:
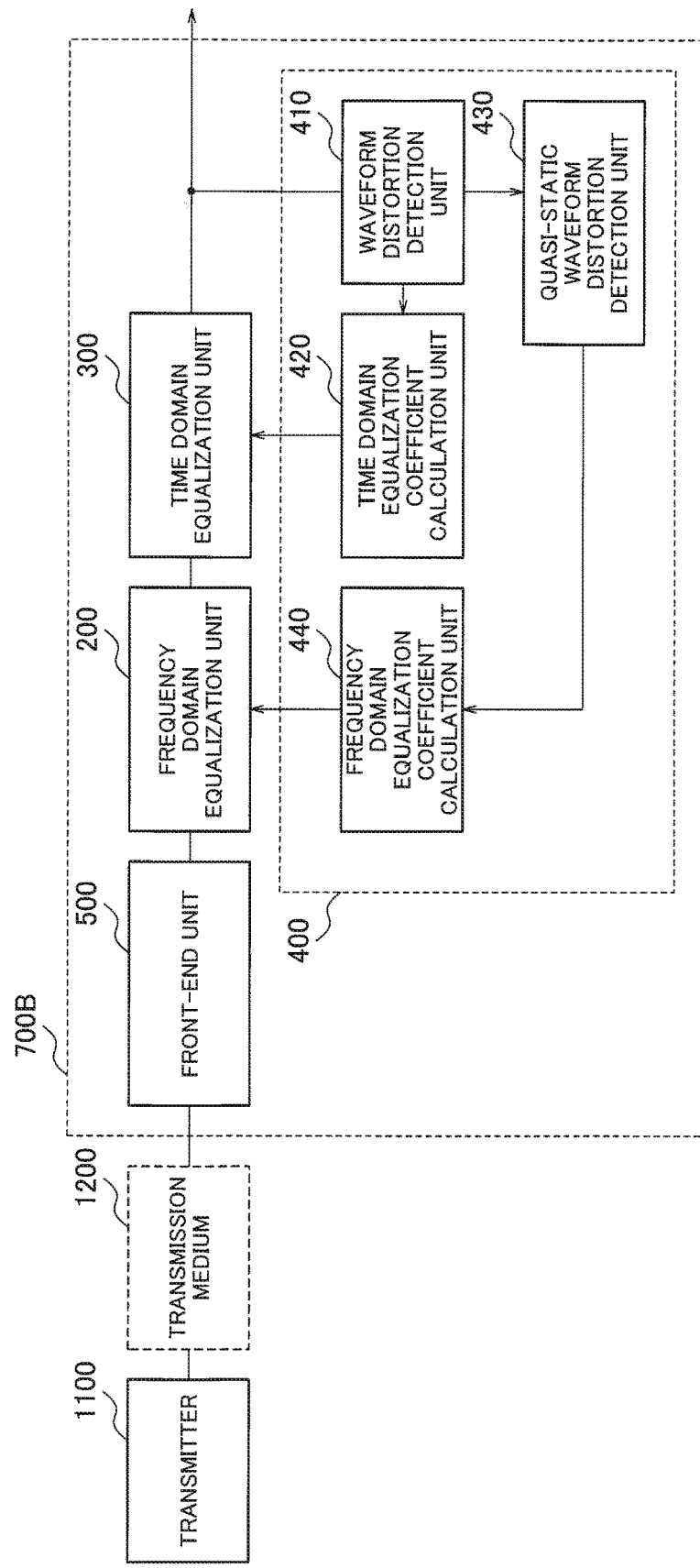
FIG. 10 is a system configuration diagram of a signal transmitting/receiving system 1000 in accordance with the second exemplary embodiment.

Further, the digital receiver 700 illustrated in FIG. 4 can also be included in a signal transmitting and receiving system. FIG. 10 illustrates a system configuration diagram of a signal transmitting/receiving system in accordance with the present exemplary embodiment. In FIG. 10, a signal transmitting/receiving system 1000 includes a transmitter 1100, a transmission medium 1200, and a digital receiver 700B.

The transmitter 1100 generates transmission signals and transmits them to the digital receiver 700B.

The transmission medium 1200 is arranged between the transmitter 1100 and the digital receiver 700B. If the communication between the transmitter 1100 and the digital receiver 700B is performed by wired system, the transmission medium 1200 is an optical fiber, for example. If the communication between the transmitter 1100 and the digital receiver 700B is performed wirelessly, the transmission medium 1200 is the air, for example. A waveform distortion is added to the signal transmitted from the transmitter 1100 because the signal is transmitted through the transmission medium 1200.

A signal which has been transmitted from the transmitter 1100 and to which a waveform distortion is added by transmitting the signal through the transmission medium 1200, is coherently detected in the front-end unit 500 of the digital receiver 700B, and is output to the frequency domain equalization unit 200. For the digital signal inputted from the front-end unit 500, an equalization is performed on a quasi-static waveform distortion of waveform distortions which are added by transmitting the signals through the transmission medium 1200 in the frequency domain equalization unit 200 with low power consumption, with a high degree of accuracy, and an equalization is performed on a dynamic waveform distortion in the time domain equalization unit 300 at a high speed.

As described above, arranging the digital receiver 700B in the signal transmitting/receiving system 1000 makes it possible to compensate a waveform distortion which is added to signals by transmitting the signals through the transmission medium 1200 with a high degree of accuracy at high speed. The signal transmitting/receiving system 1000 illustrated in FIG. 10, therefore, can maintain preferable communication states even though a time-varying waveform distortion is added due to aging, temperature fluctuation, and switching a path crossroad.

A Modified Example of the Second Exemplary Embodiment

A modified example of the second exemplary embodiment will be described. In the second exemplary embodiment, the quasi-static waveform distortion detection unit 430 is arranged in the stage subsequent to the waveform distortion detection unit 410, and the quasi-static waveform distortion detection unit 430 extracts a waveform distortion time-varying slowly from waveform distortions output by the waveform distortion detection unit 410. The method for extracting a waveform distortion time-varying slowly, however, is not limited to this.

Figure 11:
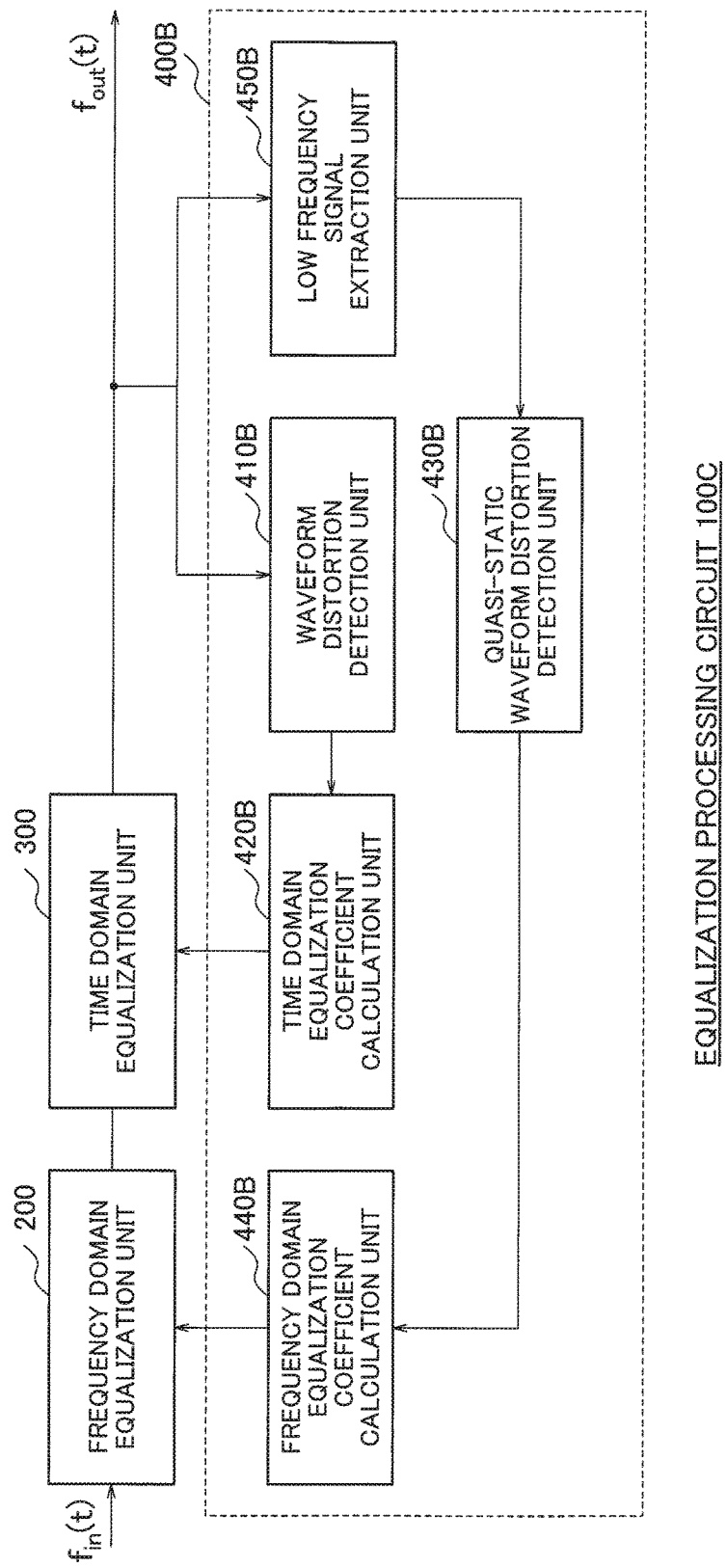
FIG. 11 is a block configuration diagram of an equalization processing circuit 100C as a modified example in accordance with the second exemplary embodiment.

FIG. 11 illustrates a block configuration diagram of an equalization processing circuit in accordance with the present exemplary embodiment. An equalization processing circuit 100C illustrated in FIG. 11 includes the frequency domain equalization unit 200, the time domain equalization unit 300, and a feedback control unit 400B. The frequency domain equalization unit 200 and the time domain equalization unit 300 illustrated in FIG. 2 which are described in the second exemplary embodiment are directly applicable to the frequency domain equalization unit 200 and the time domain equalization unit 300.

The feedback control unit 400B includes a waveform distortion detection unit 410B, a time domain equalization coefficient calculation unit 420B, a low frequency signal extraction unit 450B, a quasi-static waveform distortion detection unit 430B, and a frequency domain equalization coefficient calculation unit 440B.

A part of the digital signals on which the frequency domain equalization and the time domain equalization are performed, which are inputted into the feedback control unit 400B, are inputted into the waveform distortion detection unit 410B and the low frequency signal extraction unit 450B.

The waveform distortion detection unit 410B detects a waveform distortion of the inputted digital signals and outputs the detected results to the time domain equalization coefficient calculation unit 420B. The time domain equalization coefficient calculation unit 420B calculates time domain equalization coefficients based on a waveform distortion having high-speed temporal variation detected by the waveform distortion detection unit 410B, and outputs the calculated coefficients to the time domain equalization unit 300.

The low frequency signal extraction unit 450B detects only low frequency components from the inputted digital signals and outputs them to the quasi-static waveform distortion detection unit 430B. The low frequency signal extraction unit 450B can be implemented by a low-pass filter or an average processing circuit, for example.

The quasi-static waveform distortion detection unit 430B extracts a waveform distortion time-varying slowly from the inputted low frequency component signal and outputs the waveform distortion to the frequency domain equalization coefficient calculation unit 440B. The frequency domain equalization coefficient calculation unit 440B calculates frequency domain equalization coefficients based on the inputted waveform distortion and outputs them to the frequency domain equalization unit 200.

If a high frequency distortion component, included in the digital signal on which the frequency domain equalization and the time domain equalization are performed, is minute, the digital signal output from the time domain equalization unit 300 can directly diverge to the quasi-static waveform distortion detection unit 430B. In this case, the quasi-static waveform distortion detection unit 430B detects a waveform distortion of a low frequency signal from the inputted digital signal, further extracts a waveform distortion time-varying slowly, and outputs it to the frequency domain equalization coefficient calculation unit 440B.

Figure 12:
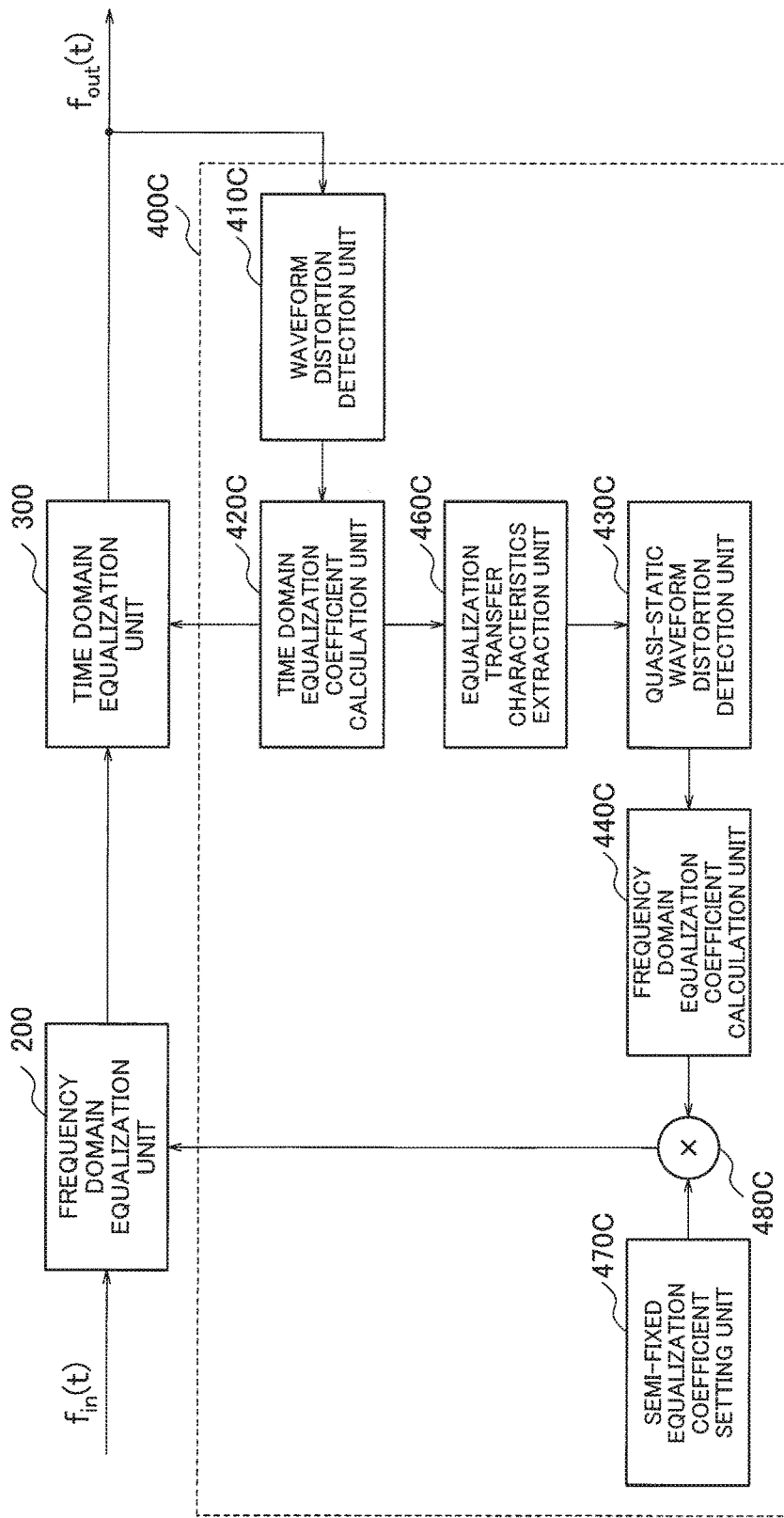
FIG. 12 is a block configuration diagram of an equalization processing circuit 100D as another modified example in accordance with the second exemplary embodiment.

Another modified example of the second exemplary embodiment will be described. FIG. 12 illustrates a block diagram of an equalization processing circuit in accordance with the present exemplary embodiment. An equalization processing circuit 100D illustrated in FIG. 12 includes the frequency domain equalization unit 200, the time domain equalization unit 300, and a feedback control unit 400C. The frequency domain equalization unit 200 and the time domain equalization unit 300 illustrated in FIG. 2 which are described in the second exemplary embodiment are directly applicable to the frequency domain equalization unit 200 and the time domain equalization unit 300.

The feedback control unit 400C includes a waveform distortion detection unit 410C, a time domain equalization coefficient calculation unit 420C, an equalization transfer characteristics extraction unit 460C, a quasi-static waveform distortion detection unit 430C, a frequency domain equalization coefficient calculation unit 440C, a semi-fixed equalization coefficient setting unit 470C, and a multiplier 480C.

The waveform distortion detection unit 410C detects a waveform distortion of the digital signal on which the frequency domain equalization and the time domain equalization are performed and outputs the waveform distortion to the time domain equalization coefficient calculation unit 420C. The time domain equalization coefficient calculation unit 420C calculates time domain equalization coefficients based on the inputted waveform distortion and outputs the coefficients to the time domain equalization unit 300 and the equalization transfer characteristics extraction unit 460C.

The equalization transfer characteristics extraction unit 460C calculates transfer characteristics of the waveform equalization which is performed in the time domain equalization unit 300 (hereinafter, referred to as equalization transfer characteristics information") using the inputted time domain equalization coefficients, and outputs the information to the quasi-static waveform distortion detection unit 430C.

If an FIR filter is applied to the time domain equalization unit 300C, and the time domain equalization coefficient calculation unit 420C calculates time domain equalization coefficients according to equalization algorithms such as CMA, LMS, and RLS, and the like, the equalization transfer characteristics extraction unit 460C calculates equalization transfer characteristics information $H_{FIR}(z)$ by formula (4).

$$H_{FIR}(z)=h_0+h_1z^{-1}+\ldots+h_{m-1}z^{-(m-1)} \quad \text{formula (4)}$$

Here, m represents the number of taps of the FIR filter, and $h_0, h_1, \ldots, h_{m-1}$ represent tap coefficients (time domain equalization coefficients) calculated by the time domain equalization coefficient calculation unit 420C. And $z^{-m}(\omega)=[\exp(j\omega T_s)]^{-m}=\exp(-j\omega m T_s)$ (j represents an imaginary unit, $f_s$ represents a sampling frequency, and $T_s=1/f_s$ represents a sampling time).

The quasi-static waveform distortion detection unit 430C extracts a quasi-static waveform distortion from the inputted equalization transfer characteristics information $H_{FIR}(z)$ and outputs the extracted quasi-static waveform distortion to the frequency domain equalization coefficient calculation unit 440C. The quasi-static waveform distortion detection unit 430C in accordance with the present exemplary embodiment calculates, from the inputted equalization transfer characteristics information $H_{FIR}(z)$, the inverse function $H^{-1}_{FIR}(z)$ of the waveform distortion $H_{FIR}(z)$ included in the digital signals output from the frequency domain equalization unit 200, and extracts a quasi-static waveform distortion based on the calculated results.

Since the $H_{FIR}(z)$ is the output result of the time domain equalization coefficient calculation unit 420C, the $H_{FIR}(z)$ temporally fluctuates adaptively. The quasi-static waveform distortion detection unit 430C detects a quasi-static waveform distortion by performing an averaging processing, a filtering processing, or the like on the $H_{FIR}(z)$ or the $H^{-1}_{FIR}(z)$ and extracting slow fluctuation components.

The frequency domain equalization coefficient calculation unit 440C calculates an error of frequency domain equalization coefficients based on the quasi-static waveform distortion extracted in the quasi-static waveform distortion detection unit 430C by a waveform equalization algorithm selected depending on system requirements, and outputs the error.

The semi-fixed equalization coefficient setting unit 470C holds a reference value of the frequency domain equalization coefficient of the frequency domain equalization unit 200.

The multiplier 480C adds the error of the frequency domain equalization coefficient calculated in the frequency domain equalization coefficient calculation unit 440C to the reference value of the frequency domain equalization coefficient held by the semi-fixed equalization coefficient setting unit 470C, and outputs the added results to the frequency domain equalization unit 200 as the frequency domain equalization coefficient.

The equalization processing circuit 100D configured as described above operates as follows. The feedback control unit 400C calculates time domain equalization coefficients based on a waveform distortion detected from the digital signals on which the frequency domain equalization and the time domain equalization are performed, and outputs the calculated coefficients to the time domain equalization unit 300.

The feedback control unit 400C calculates the transfer characteristics (equalization transfer characteristics information $H_{FIR}(z)$) of a waveform equalization using the calculated time domain equalization coefficients, extracts a quasi-static waveform distortion from the calculated transfer characteristics of the waveform equalization, and calculates an error of frequency domain equalization coefficients based on the extracted quasi-static waveform distortion. The feedback control unit 400C calculates a new frequency domain equalization coefficient by adding the calculated error of the frequency domain equalization coefficient to the reference value of the frequency domain equalization coefficient which has been held in advance, and outputs the new coefficient to the frequency domain equalization unit 200.

The frequency domain equalization unit 200 performs the frequency domain equalization on a quasi-static waveform distortion included in digital signals inputted into the equalization processing circuit 100D based on the frequency domain equalization coefficients inputted from the feedback control unit 400C, and outputs the equalized signal. Further, the time domain equalization unit 300 performs the time domain equalization on a dynamic waveform distortion included in digital signals inputted from the frequency domain equalization unit 200 based on the time domain equalization coefficients inputted from the feedback control unit 400C, and outputs the equalized signal.

As described above, the equalization processing circuits 100C and 100D in accordance with the present exemplary embodiment can output a highly controllable waveform with a high degree of accuracy and with low power consumption by separating the quasi-static waveform distortion from the dynamic waveform distortion and performing the equalization processing on them respectively.

A Third Exemplary Embodiment

A third exemplary embodiment will be described. Examples of the factor causing the quasi-static waveform distortion include, besides the variation in the frequency, a variation in the chromatic dispersion, a variation in the polarization mode dispersion, and the temperature dependence of band characteristics of a front-end device. In the present exemplary embodiment, the frequency domain equalization unit performs the chromatic dispersion compensation (CDC) on a quasi-static waveform distortion due to the variation in the chromatic dispersion, and the time domain equalization unit 300 performs the equalization on a dynamic waveform distortion.

Figure 13:
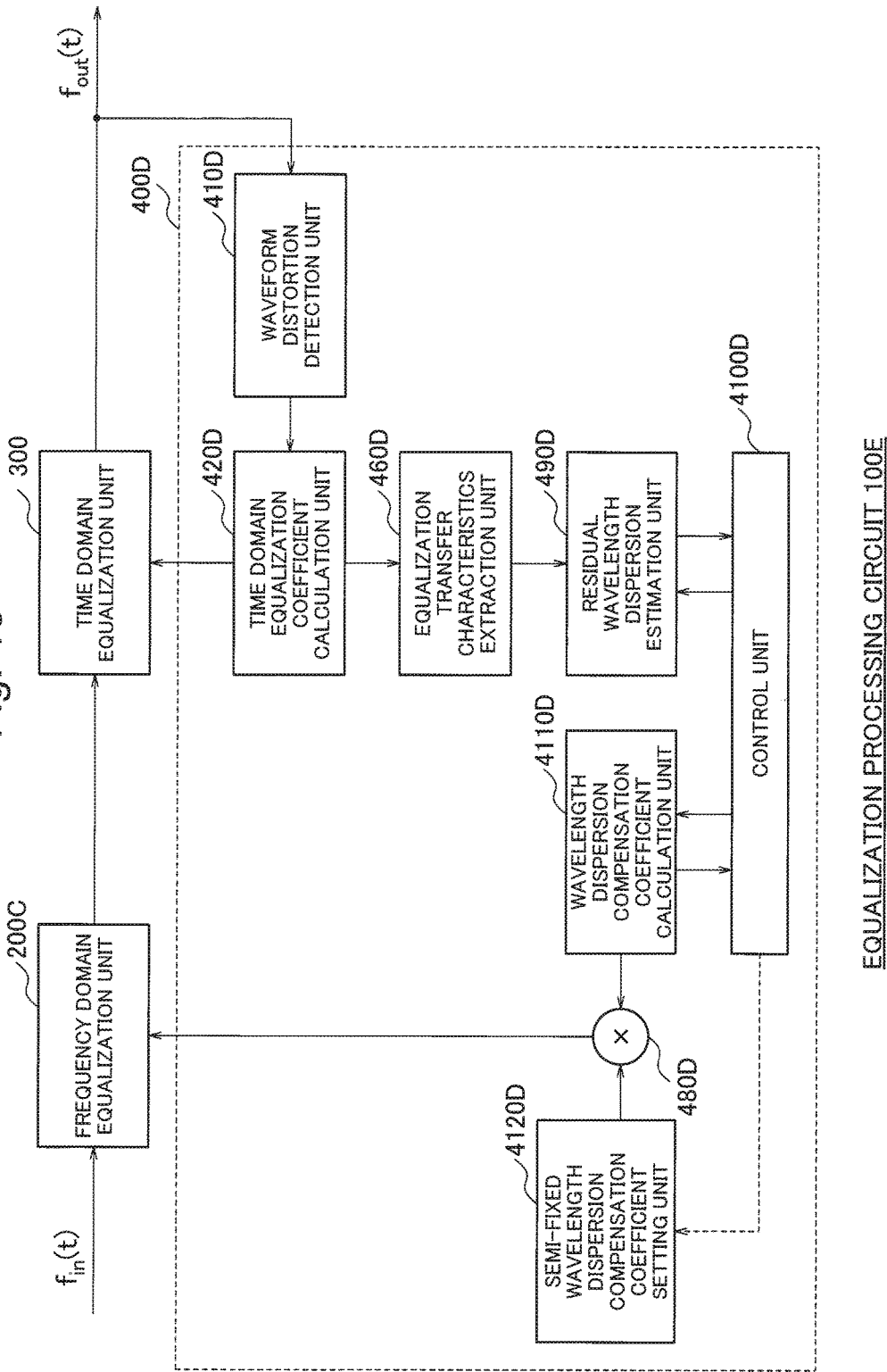
FIG. 13 is a block configuration diagram of an equalization processing circuit 100E in accordance with a third exemplary embodiment.

FIG. 13 illustrates a block configuration diagram of an equalization processing circuit in accordance with the present exemplary embodiment. In FIG. 13, the equalization processing circuit 100E includes a frequency domain equalization unit 200C, the time domain equalization unit 300, and a feedback control unit 400D. The time domain equalization unit 300 illustrated in FIG. 2 which is described in the second exemplary embodiment are directly applicable to the time domain equalization unit 300.

The frequency domain equalization unit 200C performs a residual chromatic dispersion compensation on digital signals inputted into the equalization processing circuit 100E based on chromatic dispersion compensation coefficients inputted from a multiplier 480D.

The feedback control unit 400D includes a waveform distortion detection unit 410D, a time domain equalization coefficient calculation unit 420D, an equalization transfer characteristics extraction unit 460D, a residual chromatic dispersion estimation unit 490D, a control unit 4100D, a chromatic dispersion compensation coefficient calculation unit 4110D, a semi-fixed chromatic dispersion compensation coefficient setting unit 4120D, and a multiplier 480D.

The waveform distortion detection unit 410D detects a waveform distortion of digital signals on which the frequency domain equalization and the time domain equalization are performed, and outputs the detected results to the time domain equalization coefficient calculation unit 420D. The time domain equalization coefficient calculation unit 420D calculates time domain equalization coefficients based on the inputted waveform distortion, and outputs the calculated coefficients to the time domain equalization unit 300 and the equalization transfer characteristics extraction unit 460D.

The equalization transfer characteristics extraction unit 460D extracts the equalization transfer characteristics information of the time domain equalization unit 300 from the inputted time domain equalization coefficients, and outputs the extracted information to the residual chromatic dispersion estimation unit 490D.

The residual chromatic dispersion estimation unit 490D estimates a residual dispersion compensation amount in the time domain equalization unit 300 from the inputted equalization transfer characteristics information.

The control unit 4100D reads and stores an estimate value D of the residual chromatic dispersion amount of the residual chromatic dispersion estimation unit 490D at time T and stores it in a register or the like, and at the same time, outputs a value corresponding to the residual chromatic dispersion amount D to the chromatic dispersion compensation coefficient calculation unit 4110D as a set value.

The chromatic dispersion compensation coefficient calculation unit 4110D calculates an error of the chromatic dispersion compensation coefficient based on the inputted set value D, and outputs the calculated error to the multiplier 480D. If an FIR filter is applied to the time domain equalization unit 300, the chromatic dispersion compensation coefficient calculation unit 4110D calculates filter coefficients of the frequency domain equalization unit 200C from a set value (residual wavelength compensation amount) $D_0$ at time $T_0$ inputted from the control unit 4100D using formula (5).

$$H_{CDC}(f) \approx \exp\left[j\frac{\pi\lambda^2}{c}D_0 f^2\right] = \exp(j\phi_0) \quad \text{formula (5)}$$

Here, f represents a baseband frequency of the signal, $\lambda$ represents a wavelength of the input optical signal, c represents the speed of light, and $\varphi_0$ represents a phase rotation amount due to the chromatic dispersion.

The semi-fixed chromatic dispersion compensation coefficient setting unit 4120D holds a reference value of the chromatic dispersion compensation coefficient. The reference value of the chromatic dispersion compensation coefficient held in the semi-fixed chromatic dispersion compensation coefficient setting unit 4120D is a calculated compensation coefficient corresponding to a fixed chromatic dispersion amount which is estimated in advance from a transmission path length and the like using the above-described formula (5).

The multiplier 480D adds the error of the chromatic dispersion compensation coefficient calculated in the chromatic dispersion compensation coefficient calculation unit 4110D to the reference value of the chromatic dispersion compensation coefficient obtained from the semi-fixed chromatic dispersion compensation coefficient setting unit 4120D, and outputs the results to the frequency domain equalization unit 200C as a new chromatic dispersion compensation coefficient.

Figure 14:
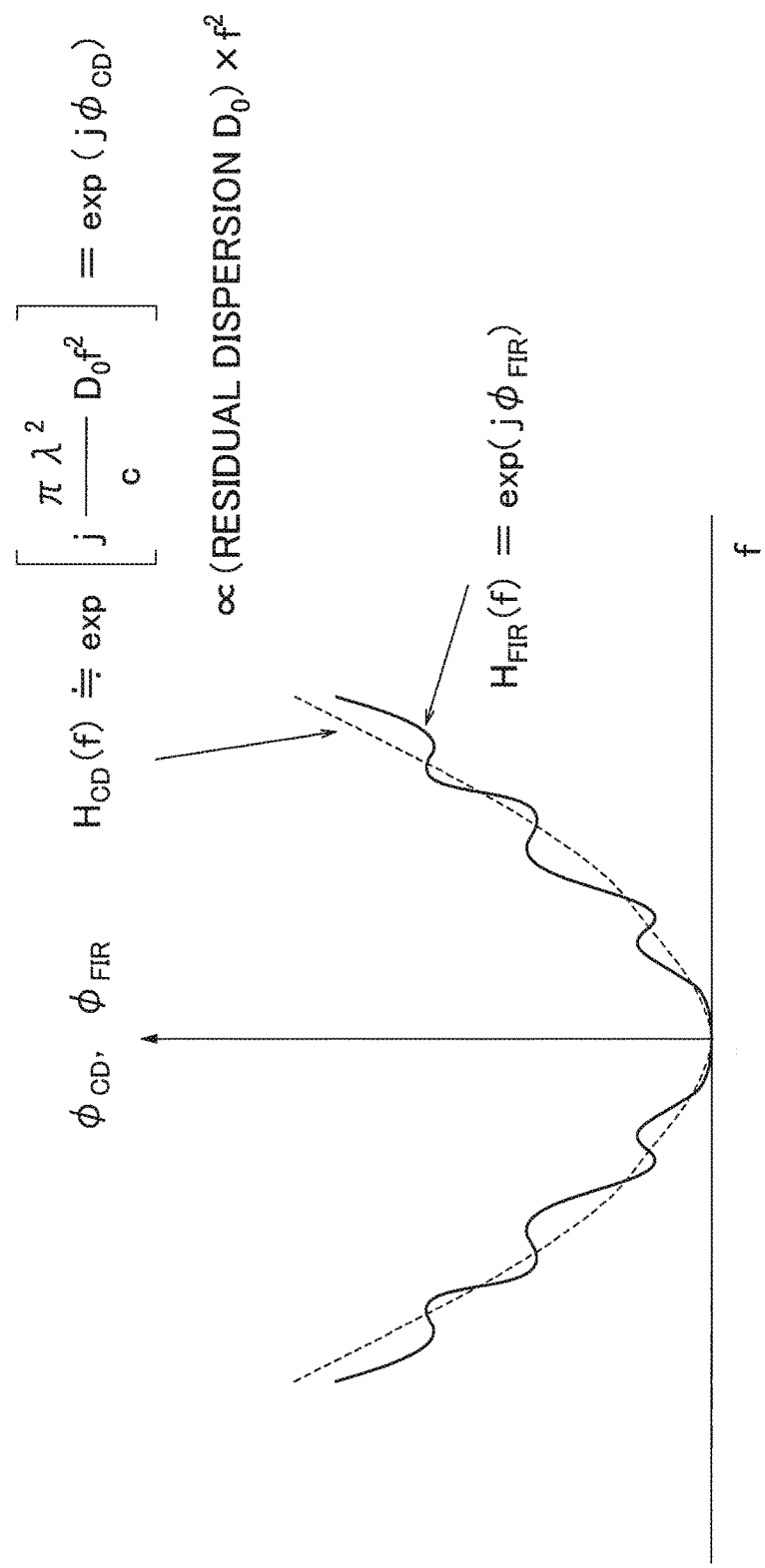
FIG. 14 is a diagram for illustrating an example of equalization transfer characteristics of an FIR filter in the equalization processing circuit 100E in accordance with the third exemplary embodiment.

Next, the detailed operation of the residual chromatic dispersion estimation unit 490D will be described with reference to FIG. 14. FIG. 14 is drawn by plotting the equalization transfer characteristics $H_{FIR}$ (a solid line) of the time domain equalization unit 300 (FIR filter), and the residual chromatic dispersion $H_{CD}$ (a dotted line) of inputted digital signals. In FIG. 14, the horizontal axis indicates a signal frequency f, and the vertical axis indicates a phase rotation amount.

As expressed in formula (5), the phase rotation amount due to the residual chromatic dispersion is proportional to the square of the frequency f. The residual chromatic dispersion estimation unit 490D, therefore, can estimate a residual chromatic dispersion $D_0$ by extracting a component proportional to $f^2$ by performing a quadric fitting or the like on a phase rotation amount $\varphi_{FIR}$ by the equalization transfer characteristics $H_{FIR}$ of the FIR filter illustrated in FIG. 14.

In general, the residual chromatic dispersion compensation amount fluctuates very slowly with a temperature fluctuation, aging, or switching a path crossroad. This makes it possible to detect a deviation of the transfer characteristics due to a quasi-static waveform distortion other than the residual chromatic dispersion compensation by averaging $H_{FIR}$ or performing a filtering processing on $H_{FIR}$, and to calculate equalization coefficients to compensate the deviation of the transfer characteristics, without performing the quadric fitting on $\varphi_{FIR}$.

Figure 15:
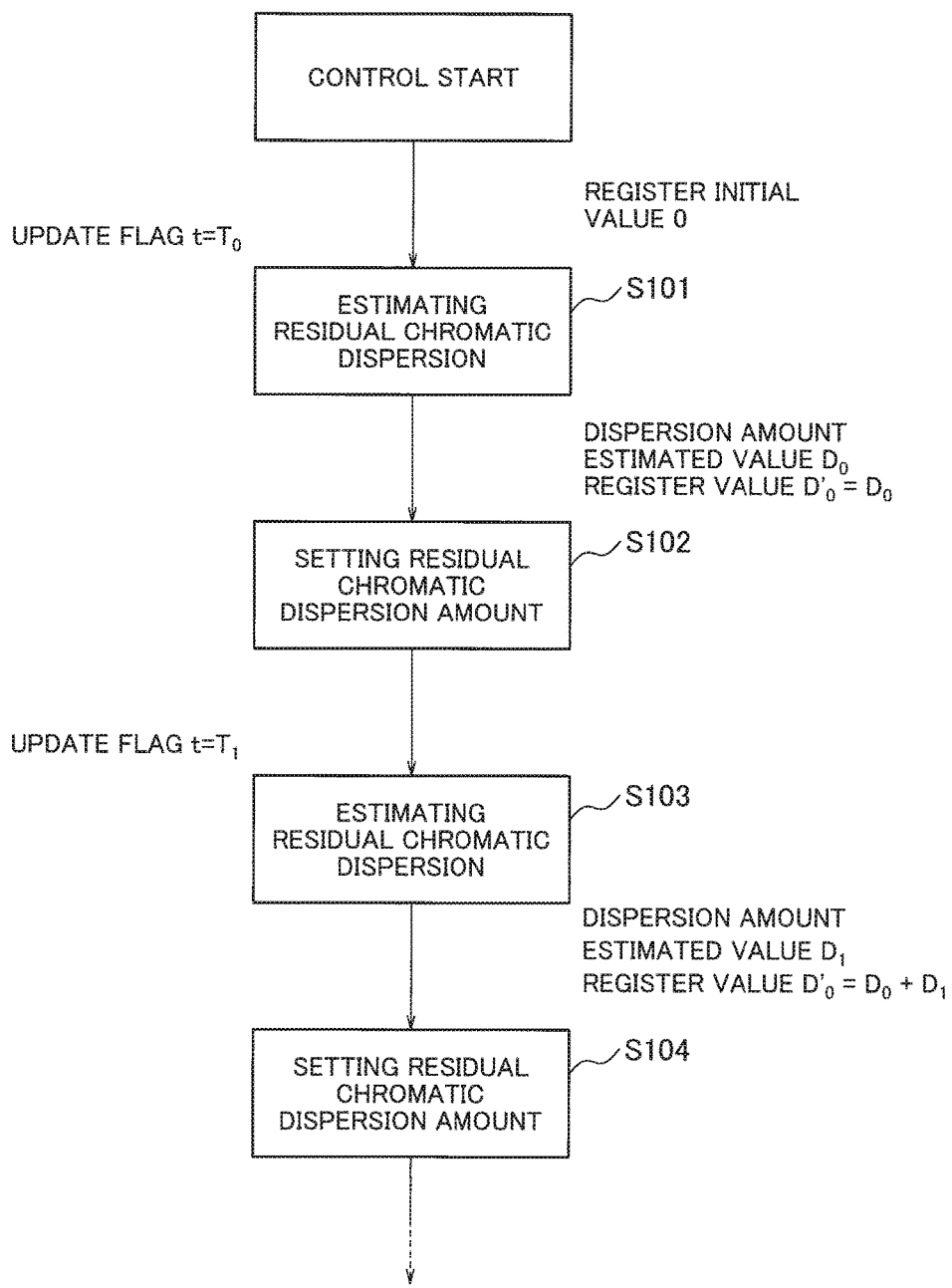
FIG. 15 is a diagram for illustrating operational procedures of a control unit 4100D and a residual chromatic dispersion estimation unit 490D in the equalization processing circuit 100E.

If the residual dispersion compensation amount estimated by the residual chromatic dispersion estimation unit 490D has varied quasi-statically from $D_0$ at time $T_0$ to $D_1$ at time $T_1$, the control unit 4100D operates as below. FIG. 15 illustrates the operational flow of the control unit 4100D and the residual chromatic dispersion estimation unit 490D.

At time $T_0$, the residual chromatic dispersion estimation unit 490D estimates the residual dispersion compensation amount $D_0$ and outputs the estimated amount to the control unit 4100D (S101). The control unit 4100D stores the residual dispersion compensation amount $D_0$ in a register and outputs a value corresponding to the residual chromatic dispersion amount $D_0$ as a set value to the chromatic dispersion compensation coefficient calculation unit 4110D—(S102).

The frequency domain equalization unit 200C performs the residual chromatic dispersion compensation based on chromatic dispersion compensation coefficients calculated from the residual dispersion estimated value $D_0$ at time $T_0$, and at time $T_1$, the residual chromatic dispersion estimation unit 490D estimates a residual dispersion compensation amount $D_1$ and outputs it to the control unit 4100D (S103).

Here, the residual dispersion compensation amount $D_1$ that the residual chromatic dispersion estimation unit 490D estimates at time $T_1$ is the difference from $D_0$ on which the residual chromatic dispersion compensation is performed in the frequency domain equalization unit 200C, different from an original residual chromatic dispersion amount included in output signals from the frequency domain equalization unit 200C.

The control unit 4100D, therefore, updates the above-mentioned register value by adding the estimated value $D_1$ at time $T_1$ to the chromatic dispersion compensation amount $D_0$ stored in the register, and outputs $D_0+D_1$ as a set value to the chromatic dispersion compensation coefficient calculation unit 4110D (S104).

Thereafter, estimating a residual dispersion compensation amount in the residual chromatic dispersion estimation unit 490D and updating a set value in the control unit 4100D are repeated at an update timing.

Here, the residual chromatic dispersion estimation unit 490D estimates, as a residual dispersion compensation amount, a residual chromatic dispersion which cannot be compensated with fixed chromatic dispersion compensation coefficients held by the semi-fixed chromatic dispersion compensation coefficient setting unit 4120D for the chromatic dispersion included in inputted digital signals. Therefore, it is also possible to be processed as follows. That is to say, the control unit 4100D directly obtains a reference value $D_0$ of the chromatic dispersion compensation coefficient held in the semi-fixed chromatic dispersion compensation coefficient setting unit 4120D. Then the control unit 4100D adds the obtained reference value $D_0$ to the estimated value $D_1$ of the residual chromatic dispersion amount at time $T_1$ inputted from the residual dispersion estimation unit 490D. The control unit 4100D outputs $(D_0+D_1)$ as a new set value $D_1'$ to the chromatic dispersion compensation coefficient calculation unit 4110D. In this case, it is not necessarily required for the control unit 4100D to hold the set value $D_1'$ in a register.

Although the frequency domain equalization unit 200C performs the residual chromatic dispersion compensation as the quasi-static waveform distortion compensation in the equalization processing circuit 100E in accordance with the present exemplary embodiment, applying a similar configuration makes it also possible to compensate waveform distortions due to the polarization mode dispersion or analog front-end devices or the like. For example, NPL 1 described in Background Art discloses methods for detecting a variety of waveform distortions, in addition to the chromatic dispersion estimation, such as the polarization mode dispersion and the polarization dependent loss by means of the digital signal processing. Applying those methods to the equalization processing circuit 100E in accordance with the present exemplary embodiment makes it possible to compensate a quasi-static waveform distortion with a high degree of accuracy and with low power consumption.

A Fourth Exemplary Embodiment

Figure 16:
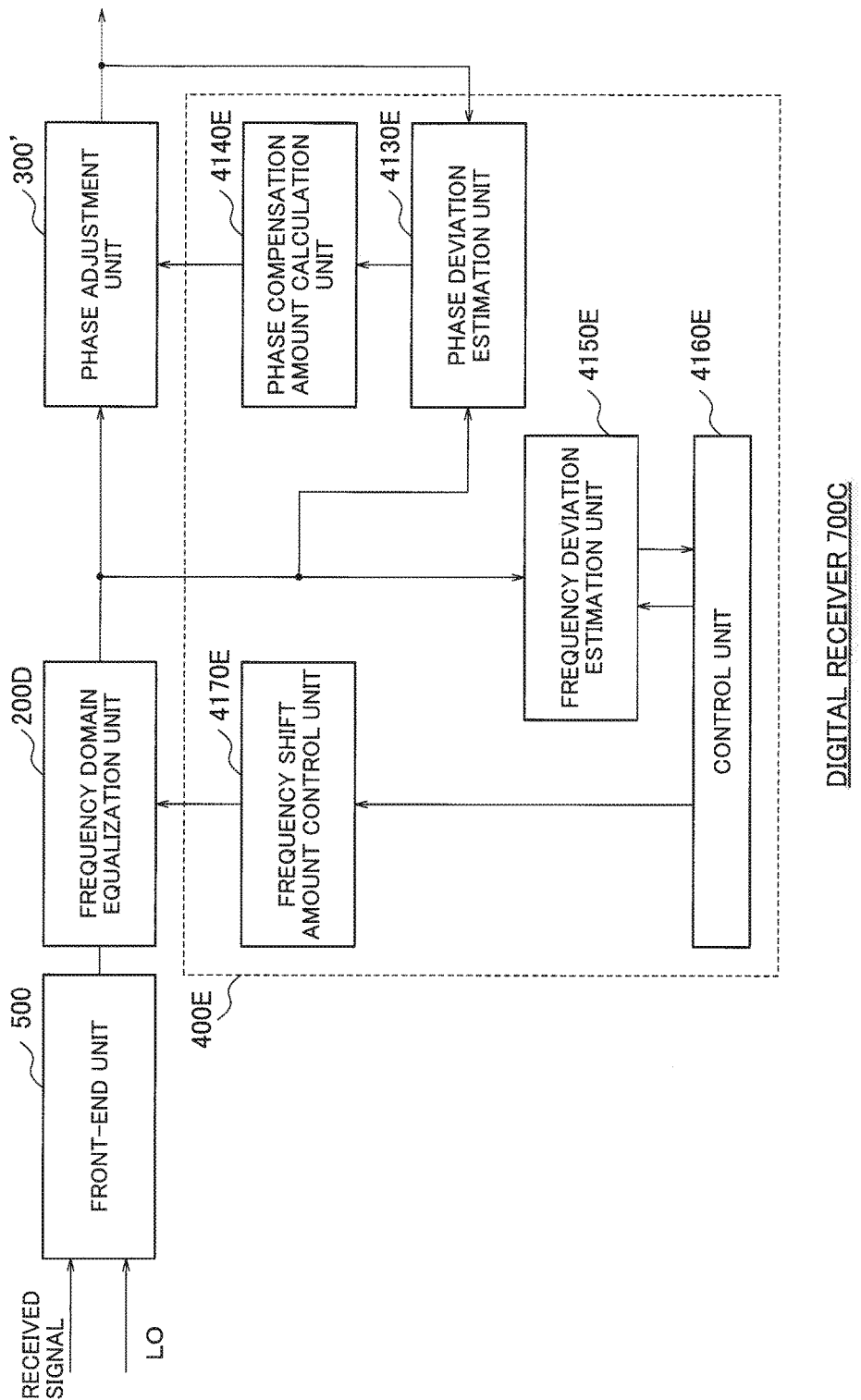
FIG. 16 is a block configuration diagram of a digital receiver 700C in accordance with a fourth exemplary embodiment.

A fourth exemplary embodiment will be described. FIG. 16 illustrates a block configuration diagram of a digital receiver in accordance with the present exemplary embodiment. In FIG. 16, the digital receiver 700C includes the front-end unit 500, a frequency domain equalization unit 200D, a phase adjustment unit 300', and a feedback control unit 400E.

The front-end unit 500 mixes received signals inputted into the digital receiver 700C with local oscillation (LO) signals, and outputs the resultant signals to the frequency domain equalization unit 200D as baseband signals. At this time, a deviation (a shift) arises between the carrier frequency of the received signal and the frequency of the LO.

The frequency domain equalization unit 200D compensates frequency deviation with respect to the inputted baseband signal based on the control by a frequency shift amount control unit 4170E, and outputs the resultant signals to the phase adjustment unit 300'. The frequency domain equalization unit 200D compensates the frequency deviation by uniformly shifting the frequency of the inputted baseband signal to the high-frequency side or the low-frequency side.

The phase adjustment unit 300' compensates the frequency deviation which the frequency domain equalization unit 200D cannot eliminate by performing a frequency deviation compensation with a still higher degree of accuracy with respect to inputted baseband signals whose frequency deviation has been compensated. The phase adjustment unit 300' in accordance with the present exemplary embodiment adjusts a phase of the inputted baseband signal based on the control of a phase compensation amount calculation unit 4140E. Because the phase adjustment unit 300' is required to show a fast time response, it generally performs signal processing in time domain that is capable of fast control. The phase adjustment unit 300' adjusts phases fast by performing the time domain signal processing.

The feedback control unit 400E controls by feedback the frequency domain equalization unit 200D and the phase adjustment unit 300'. The feedback control unit 400E includes a phase deviation estimation unit 4130E, a phase compensation amount calculation unit 4140E, a frequency deviation estimation unit 4150E, a control unit 4160E, and a frequency shift amount control unit 4170E.

In the feedback control unit 400E, baseband signals inputted from the frequency domain equalization unit 200D are branched to the phase deviation estimation unit 4130E and the frequency deviation estimation unit 4150E.

Baseband signals from the frequency domain equalization unit 200D and baseband signals from the phase adjustment unit 300' are inputted into the phase deviation estimation unit 4130E. The phase deviation estimation unit 4130E estimates a phase deviation from the inputted two kinds of baseband signals and outputs the resultant signal to the phase compensation amount calculation unit 4140E. The phase deviation estimation unit 4130E estimates a phase deviation by the methods disclosed in PTL 1 in Background Art and its cited literature, a method by m-th power estimation, or the like.

The phase compensation amount calculation unit 4140E determines a phase compensation amount based on the inputted estimation results of the phase deviation and controls a phase compensation amount of the phase adjustment unit 300'. For example, if a phase deviation estimated by the phase deviation estimation unit 4130E is represented by $\theta$, the phase compensation amount calculation unit 4140E calculates $\exp(-j\theta)$ as a phase compensation amount and makes the phase adjustment unit 300' multiply main signals by $\exp(-j\theta)$.

The frequency deviation estimation unit 4150E coarsely estimates a frequency deviation amount from the baseband signals inputted from the frequency domain equalization unit 200D and outputs the resultant signal to the control unit 4160E. The frequency deviation estimation unit 4150E estimates the frequency deviation amount by a method disclosed in PTL 1 in Background Art or an estimation method using a pilot tone training signal.

The control unit 4160E reads an estimated value F of the frequency deviation at a time T in the frequency deviation estimation unit 4150E and stores it in a register or the like, and at the same time, outputs a value corresponding to the estimated value F of the frequency deviation as a set value to the frequency shift amount control unit 4170E.

The frequency shift amount control unit 4170E determines a compensation amount of the frequency deviation (a frequency shift amount) based on the set value inputted from the control unit 4160E, and controls the frequency shift amount of the frequency domain equalization unit 200D.

For example, in an initial state, the control unit 4160E sets a set value $\Delta f_0$ in the frequency shift amount control unit 4170E, and stores the set initial value $\Delta f_0$ in a register or the like. Because the frequency domain equalization unit 200D performs a frequency shift of $\Delta f_0$ at this time, the frequency deviation estimation unit 4150E arranged in the stage subsequent to the frequency domain equalization unit 200D detects, as an estimated value, a value $\Delta f_1$ with the frequency compensated by $\Delta f_0$ from the original frequency deviation.

At the time $T_1$ when a frequency deviation varies quasi-statically due to aging or a temperature fluctuation, the control unit 4160E reads an estimated value $\Delta f_1$ of the frequency deviation in the frequency deviation estimation unit 4150E. The control unit 4160E updates a register value by setting $\Delta f_0 + \Delta f_1$ as a new set value, and at the same time, updates the set value of the frequency shift amount control unit 4170E to make it $\Delta f_0 + \Delta f_1$. After that, by repeating a similar control at the timing when the frequency deviation varies quasi-statically, the digital receiver 700C can consistently perform favorable frequency deviation compensation.

In the digital receiver 700C in accordance with the present exemplary embodiment, the frequency domain equalization unit 200D performs a frequency shift with respect to a quasi-static relatively slow fluctuation of the frequency deviation based on the control by the frequency shift amount control unit 4170E. In this case, it is possible to achieve the frequency control with a high degree of accuracy by the frequency domain equalization without performing a complex control such as a phase-locked loop (PLL).

In addition, by separating a relatively slow fluctuation of the frequency deviation and processing it in the frequency domain equalization unit 200D, it is possible to reduce the load on the phase adjustment unit 300' with high-speed processing. The digital receiver 700C in accordance with the present exemplary embodiment, therefore, can output a highly controllable waveform with a high degree of accuracy and with low power consumption.

Although the output signals from the frequency domain equalization unit 200D are made to diverge to the phase deviation estimation unit 4130E and the frequency deviation estimation unit 4150E in the above-described digital receiver 700C, it is also possible to make the output signals from the phase adjustment unit 300' diverge. In this case, the phase deviation estimation unit 4130E performs the phase adjustment in a feedback manner by a DD-PLL (decision directed phase-locked loop) algorithm.

The present invention is not limited to the above-described exemplary embodiments, and a modification of the design or the like is included in the present invention without departing from the scope of the present invention.

INDUSTRIAL APPLICABILITY

The equalization processing circuit in accordance with the present invention can be applied to an optical communication system which handles optical polarization multiplexed phase modulation signals such as polarization multiplexed QPSK (Quadrature Phase Shift Keying) signals and polarization multiplexed 16QAM (Quadrature Amplitude Modulation) signals.

This application is based upon and claims the benefit of priority from Japanese Patent Application No. 2013-254116, filed on Dec. 9, 2013, the disclosure of which is incorporated herein in its entirety by reference.

REFERENCE SIGNS LIST 10 equalization processing circuit
20 frequency domain equalization unit
30 time domain equalization unit
40, 40B, 40C waveform distortion detection unit 41B, 41C quasi-static waveform distortion extraction unit
42B, 42C dynamic waveform distortion extraction unit
43C low frequency signal extraction unit
50 frequency domain equalization coefficient control unit
60 time domain equalization coefficient control unit
100, 100B, 100C, 100D, 100E equalization processing circuit
200, 200B, 200C, 200D frequency domain equalization unit
201 DFT
202 multiplier
203 IDFT
300, 300B time domain equalization unit
310B butterfly FIR filter
300' phase adjustment unit
400, 400B, 400C, 400D, 400E feedback control unit
410, 410B, 410C, 410D waveform distortion detection unit
420, 420B, 420C, 420D time domain equalization coefficient calculation unit
430, 430B, 430C quasi-static waveform distortion detection unit
440, 440B, 440C frequency domain equalization coefficient calculation unit
450B low frequency signal extraction unit
460C, 460D equalization transfer characteristics extraction unit
470C semi-fixed equalization coefficient setting unit
480C, 480D multiplier
490D residual chromatic dispersion estimation unit
4100D control unit
4110D chromatic dispersion compensation coefficient calculation unit
4120D semi-fixed chromatic dispersion compensation coefficient setting unit
4130E phase deviation estimation unit
4140E phase compensation amount calculation unit
4150E frequency deviation estimation unit
4160E control unit
4170E frequency shift amount control unit
500, 500B, 500C, 500D front-end unit
510 polarization diversity 90° hybrid
521, 522, 523, 524 photoelectric conversion unit
530B filter
540B low noise amplifier
550B mixer
560B reference signal source
570B filter
580B variable gain amplifier
590B A/D conversion unit
600 A/D conversion unit
610, 620, 630, 640 A/D conversion circuit
700, 700B, 700C digital receiver
700', 700" digital receiving unit
800, 810B, 820B antenna
900, 900B digital receiving terminal device
1000 signal transmitting/receiving system
1100 transmitter
1200 transmission medium

What is claimed is:

1. An equalization processing circuit, comprising:
frequency domain equalizer configured to perform a frequency domain equalization on an inputted digital signal using an inputted frequency domain equalization coefficient;
time domain equalizer configured to perform a time domain equalization on the inputted digital signal using an inputted time domain equalization coefficient;
waveform distortion detector configured to detect a dynamic waveform distortion and a quasi-static waveform distortion of an equalized digital signal, the waveform distortion detector including a dynamic waveform distortion extractor configured to extract the dynamic waveform distortion from the equalized digital signal and a quasi-static waveform distortion extractor configured to extract the quasi-static waveform distortion from the equalized digital signal;
frequency domain equalization coefficient controller configured to calculate and output the frequency domain equalization coefficient based on the quasi-static waveform distortion extracted; and
time domain equalization coefficient controller configured to calculate and output the time domain equalization coefficient based on the dynamic waveform distortion extracted,
wherein the waveform distortion detector further includes a low frequency signal extractor configured to extract a low frequency signal from the equalized digital signal, and
wherein the quasi-static waveform distortion extractor is further configured to extract the quasi-static waveform distortion from the low frequency signal extracted.

2. The equalization processing circuit according to claim 1,
wherein the quasi-static waveform distortion extractor is further configured to extract the quasi-static waveform distortion using a component varying at low speed in a time domain equalization coefficient calculated based on the dynamic waveform distortion extracted.

3. The equalization processing circuit according to claim 2,
wherein the frequency domain equalizer performs a residual chromatic dispersion compensation as a frequency domain equalization;
the waveform distortion detector detects a residual chromatic dispersion of the equalized digital signal as the quasi-static waveform distortion; and
the frequency domain equalization coefficient controller calculates a chromatic dispersion compensation coefficient to compensate the residual chromatic dispersion detected as a frequency domain equalization coefficient.

4. The equalization processing circuit according to claim 1,
wherein the frequency domain equalizer performs a residual chromatic dispersion compensation as a frequency domain equalization;
the waveform distortion detector detects a residual chromatic dispersion of the equalized digital signal as the quasi-static waveform distortion; and
the frequency domain equalization coefficient controller calculates a chromatic dispersion compensation coefficient to compensate the residual chromatic dispersion detected as a frequency domain equalization coefficient.

5. The equalization processing circuit according to claim 1,
wherein the frequency domain equalizer performs a residual chromatic dispersion compensation as a frequency domain equalization;

the waveform distortion detector detects a residual chromatic dispersion of the equalized digital signal as the quasi-static waveform distortion; and the frequency domain equalization coefficient controller calculates a chromatic dispersion compensation coefficient to compensate the residual chromatic dispersion detected as a frequency domain equalization coefficient.

6. A digital receiver, comprising:

front-end interface configured to coherently detect an inputted signal using a local oscillator signal and output a resultant signal;

A/D converter configured to convert a coherently detected signal into a digital signal and output a resultant signal; and an equalization processing circuit into which the digital signal being inputted, wherein the equalization processing circuit includes frequency domain equalizer configured to perform a frequency domain equalization on an inputted digital signal using an inputted frequency domain equalization coefficient;

time domain equalizer configured to perform a time domain equalization on the inputted digital signal using an inputted time domain equalization coefficient;

waveform distortion detector configured to detect a dynamic waveform distortion and a quasi-static waveform distortion of an equalized digital signal, the waveform distortion detector including a dynamic waveform distortion extractor configured to extract the dynamic waveform distortion from the equalized digital signal and a quasi-static waveform distortion extractor configured to extract the quasi-static waveform distortion from the equalized digital signal;

frequency domain equalization coefficient controller configured to calculate and output the frequency domain equalization coefficient based on the quasi-static waveform distortion extracted; and time domain equalization coefficient controller configured to calculate and output the time domain equalization coefficient based on the dynamic waveform distortion extracted, wherein the waveform distortion detector further includes a low frequency signal extractor configured to extract a low frequency signal from the equalized digital signal, and wherein the quasi-static waveform distortion extractor is further configured to extract the quasi-static waveform distortion from the low frequency signal extracted.

7. The digital receiver according to claim 6, wherein the waveform distortion detector includes phase deviation obtainer configured to obtain a phase deviation between the inputted digital signal and the local oscillator signal, and frequency deviation obtainer configured to obtain a frequency deviation between the inputted digital signal and the local oscillator signal;

the frequency domain equalization coefficient controller calculates a frequency shift amount to compensate the frequency deviation obtained and outputs a resultant signal as a frequency domain equalization coefficient, the time domain equalization coefficient controller calculates a phase compensation amount to compensate the phase deviation obtained, and outputs a resultant signal as a time domain equalization coefficient;

the frequency domain equalizer performs a frequency shift as a frequency domain equalization, and the time domain equalizer performs a phase adjustment as a time domain equalization.

8. The digital receiver according to claim 7, further comprising an antenna configured to receive a signal, wherein the front-end interface coherently detects the signal received.

9. The digital receiver according to claim 7, wherein the inputted signal is transmitted by a digital transmitter.

10. The digital receiver according to claim 7, wherein the inputted signal is transmitted by a digital transmitter.

11. The digital receiver according to claim 6, further comprising an antenna configured to receive a signal, wherein the front-end interface coherently detects the signal received.

12. The digital receiver according to claim 6, wherein the inputted signal is transmitted by a digital transmitter.

13. The digital receiver according to claim 6, wherein the waveform distortion detector includes dynamic waveform distortion extractor configured to extract a dynamic waveform distortion from the equalized digital signal;

low frequency signal extractor configured to extract a low frequency signal from the equalized digital signal; and quasi-static waveform distortion extractor configured to extract a quasi-static waveform distortion from the low frequency signal extracted.

14. The digital receiver according to claim 6, wherein the waveform distortion detector includes dynamic waveform distortion extractor configured to extract a dynamic waveform distortion from the equalized digital signal;

quasi-static waveform distortion extractor configured to extract a quasi-static waveform distortion from the equalized digital signal using a time domain equalization coefficient calculated based on the dynamic waveform distortion extracted.

15. The digital receiver according to claim 6, wherein the frequency domain equalizer performs a residual chromatic dispersion compensation as a frequency domain equalization;

the waveform distortion detector detects a residual chromatic dispersion of the equalized digital signal as the quasi-static waveform distortion; and the frequency domain equalization coefficient controller calculates a chromatic dispersion compensation coefficient to compensate the residual chromatic dispersion detected as a frequency domain equalization coefficient.

16. An equalization processing method, comprising:

performing a frequency domain equalization on an inputted digital signal using a calculated frequency domain equalization coefficient and performing a time domain equalization on the inputted digital signal using a calculated time domain equalization coefficient;

extracting a low frequency signal from the digital signal equalized;

extracting a dynamic waveform distortion and a quasi-static waveform distortion from the low frequency signal extracted from the digital signal equalized;

calculating a frequency domain equalization coefficient based on the quasi-static waveform distortion extracted and calculating a time domain equalization coefficient based on the dynamic waveform distortion extracted.

17. The equalization processing method according to claim 16, further comprising:
coherently detecting an inputted signal using a local oscillator signal and outputting a resultant signal;
converting a coherently detected signal into a digital signal and outputting a resultant signal;
wherein the inputted digital signal is equal to the digital signal outputted.

* * * * *